United States Patent [19]

Itoh et al.

[11] Patent Number: 5,231,518

[45] Date of Patent: Jul. 27, 1993

[54] IMAGE PROCESSING APAPRATUS FOR PREPARING PRINTING PLATES HAVING LENGTHWISE OR CROSSWISE PATTERNS

[75] Inventors: Shinji Itoh; Takashi Hoshino; Tadashi Miyakawa, all of Kaisei-Machi, Japan

[73] Assignee: Fuji Photo Film Co., Ltd., Kanagawa, Japan

[21] Appl. No.: 677,691

[22] Filed: Mar. 29, 1991

[30] Foreign Application Priority Data

Apr. 2, 1990 [JP] Japan .................................. 2-87660

[51] Int. Cl.⁵ .............................................. H04N 1/40
[52] U.S. Cl. .................................. 358/456; 358/468; 358/298
[58] Field of Search .................. 358/468, 456, 76, 80, 358/296, 298; 355/40, 43, 45, 85

[56] References Cited

U.S. PATENT DOCUMENTS

| | | | |
|---|---|---|---|
| 3,800,071 | 3/1974 | Reeber | 358/76 |
| 3,828,319 | 8/1974 | Owen et al. | 358/261.1 |
| 4,825,296 | 4/1989 | Wagensonner et al. | 358/76 |
| 4,951,160 | 8/1990 | Nagahara et al. | 358/486 |

FOREIGN PATENT DOCUMENTS

| | | |
|---|---|---|
| 0294622 | 12/1988 | European Pat. Off. |
| 2109192 | 5/1983 | United Kingdom . |
| 2148655 | 5/1985 | United Kingdom . |

OTHER PUBLICATIONS

Patent Abstracts of Japan, vol. 11, No. 72, Mar. 1987.
European Search Report.

Primary Examiner—Edward L. Coles, Sr.
Attorney, Agent, or Firm—Sughrue, Mion, Zinn, Macpeak & Seas

[57] ABSTRACT

According to this invention, the original cassette accommdates the color originals having difference sizes The original cassette is mounted on an original board. Plane scanning is carried out without causing flare by use of an image sensor in accordance with a transmissive method or a reflective method. Auxiliary scanning is then effected after executing a linear reading process, thereby obtaining image data of the whole. Printing plates of CMY and black (K) are directly outputted. Processing is performed by executing rough prescanning and fine main scanning when reading the image. The conditional parameters for processing the images are automatically (or manually) set based on the data stored. The images can be outputted at a high efficiency from a relation between the original and the photosensitive material. The image processing system of this invention has a function to indicate a speed preference mode, a photosensitive material consumption preference mode an a quality preference mode. When indicating the speed preference mode, an output pattern having the least number of scannings is selected. When indicating the photosensitive material consumption preference mode, there is selected an output pattern in which the top end of the printing plate to be outputted is the closest to the output original point. In the case or indicating the quality preference mode, the quality of the output image is enhanced by increasing the read resolution in the input unit. In this case, the optical magnifications are calculated, wherein the short and long sides of the original reading range undergo the main scanning.

6 Claims, 22 Drawing Sheets

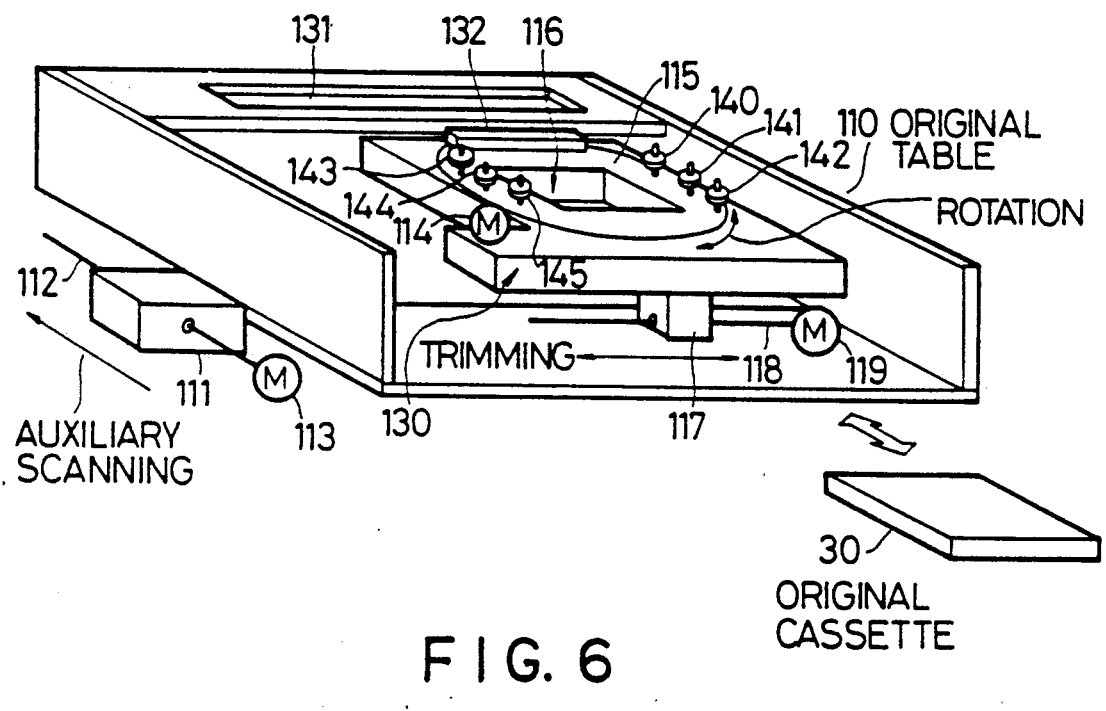
F I G. 6
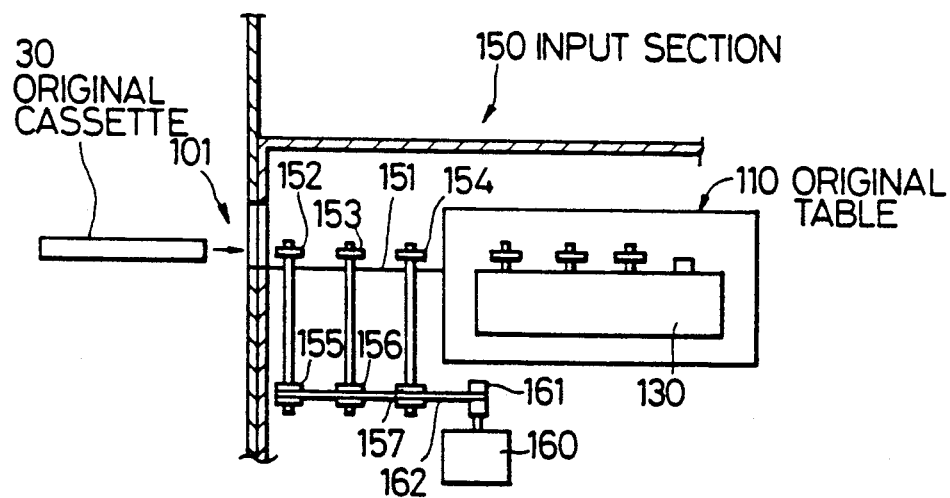
F I G. 7

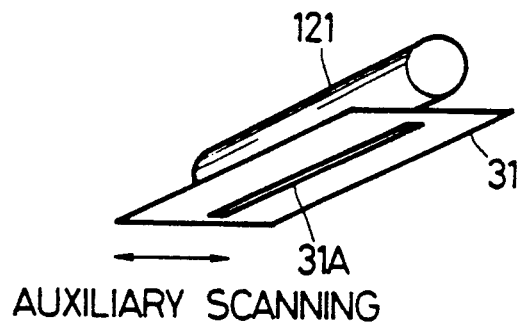
AUXILIARY SCANNING
F I G. 9
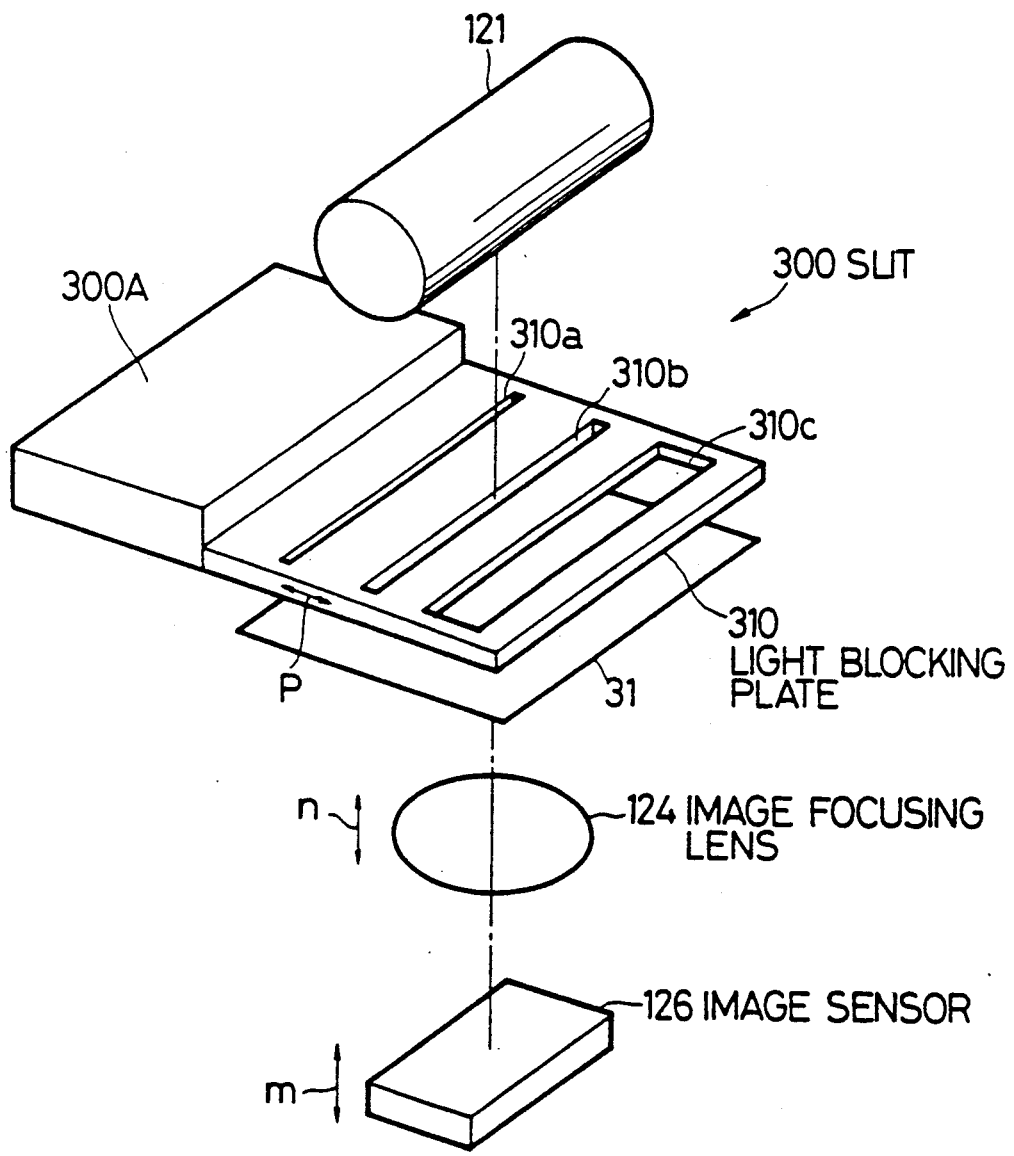
F I G. 10

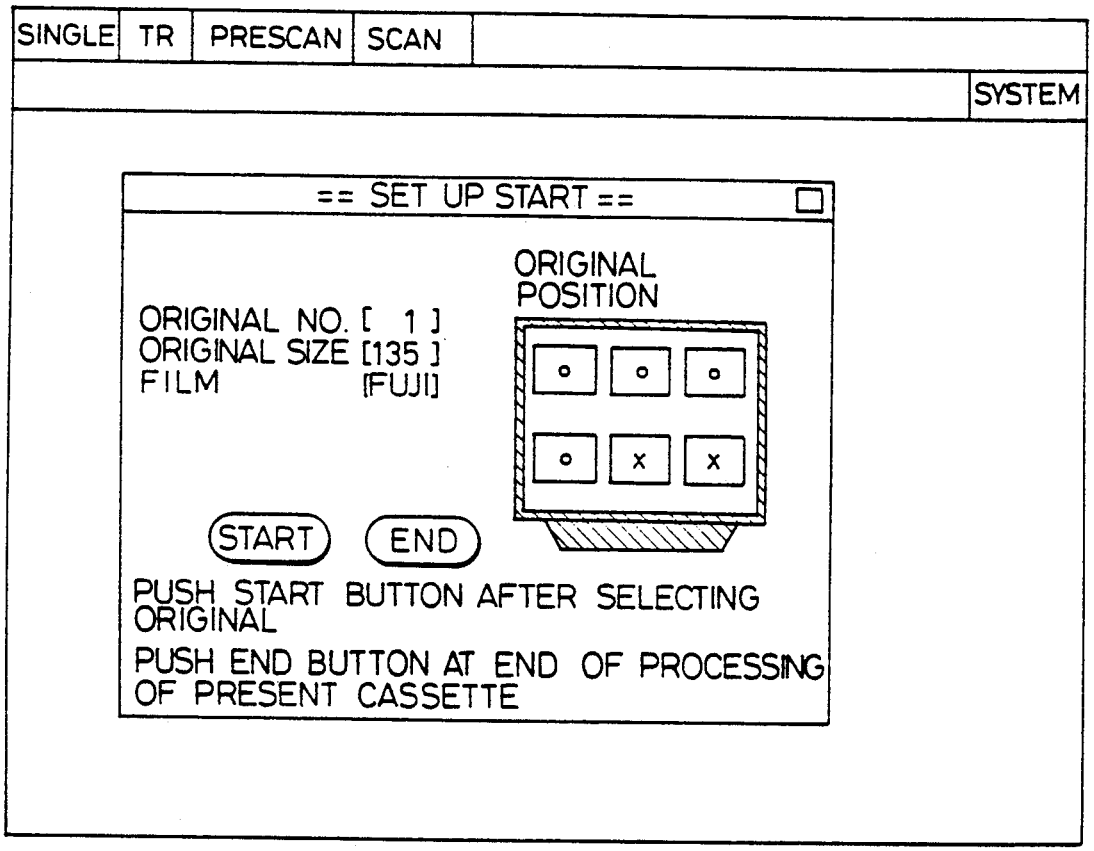
F I G. 17

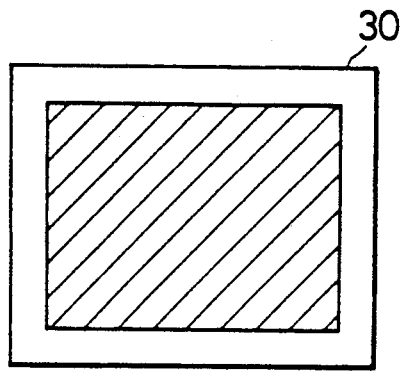 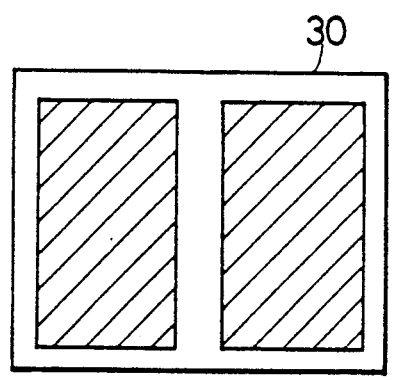
F I G. 18A    F I G. 18B
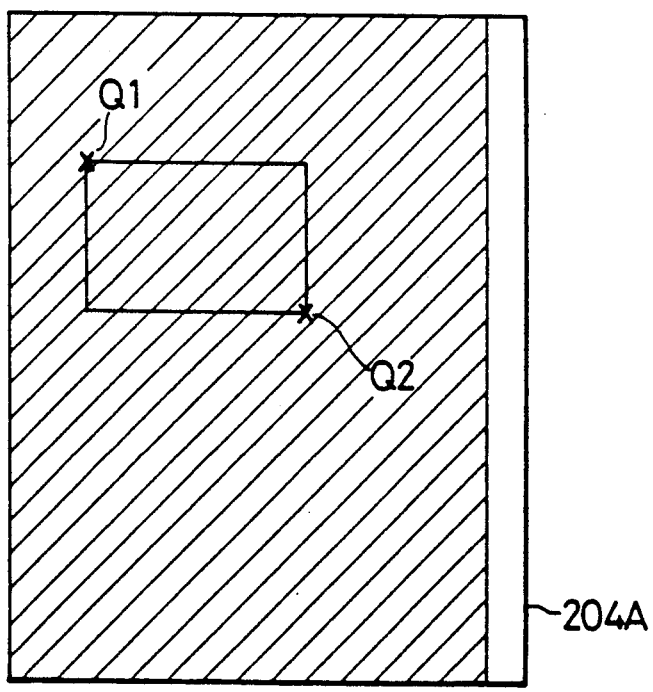
F I G. 19

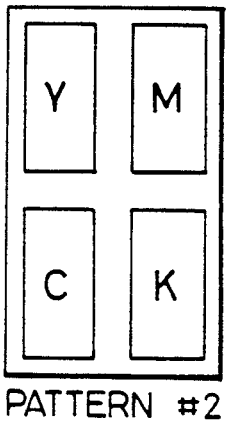
FIG. 24A PATTERN #1
FIG. 24B PATTERN #2
FIG. 24C PATTERN #3
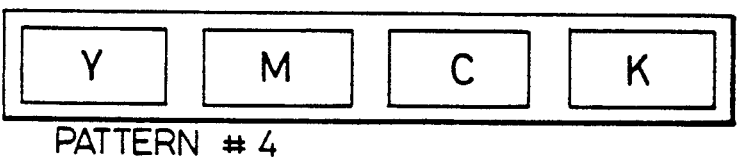
FIG. 25A PATTERN #4
FIG. 25B PATTERN #5
FIG. 25C PATTERN #6

IMAGE PROCESSING APAPRATUS FOR PREPARING PRINTING PLATES HAVING LENGTHWISE OR CROSSWISE PATTERNS

BACKGROUND OF THE INVENTION

1. Field of the Invention

This invention is directed to a high-speed and high efficiency image processing system of a plane scanning type. This invention relates more particularly to an image processing system arranged as follows. A color original is read by rough prescanning, the read data is stored, conditional parameters are set, and the color original is read by fine main scanning and processed. An image of the color original is efficiently recorded on a photosensitive material, thus preparing a printing plate. Besides, there can be selected either a speed preference mode to reduce a scanning time or a photosensitive material consumption preference mode to decrease consumption of the photosentitive material. Independently of these modes, there can be indicated a quality preference mode to enhance an output by increasing a read resolution in an input unit.

2. Description of the Prior Art

The following is a description of a conventional method of preparing color separations. A plurality of color originals are laid out per color separation. For this purpose, a halftone color separation film is prepared with a predetermined magnification by use of a color scanner. A mask plate prepared by a separate process and the halftone color separation film are allocated on a layout sheet, and each original is stuck. Contact exposure is then effected, thereby preparing a laid-out color separation. This method, however, presents the following defects. This method is large in the number of processes and also complicated. A highly skillful technique is required, wherein the color separation is disposed in the neighborhood of a predetermined position and stuck onto the layout sheet. A good deal of time, labor and materials are also needed. The plurality of color originals are color-printed at specified magnifications. The prepared duplicated original is cut out into a predetermined block copy pattern. The pattern is stuck in a predetermined position of a block copy layout sheet. A laid-out color image is then copied. This method is, however, based on a photographic technique. It is therefore impossible to freely change a color correction process, a sharpness emphasis and a gradation conversion process. This is a problem in terms of an image quality. Besides, a system (e.g., Japanese Patent Publication No. 31762/1977) for simultaneously layout-outputting rectangular images by a plurality of input devices has the following defects. It is hard to correspond to arbitrary graphics. Preparation of the mask plate requires labor. Inputting of the color originals needs a plurality of input scanning units.

In recent years, there has been proposed a layout retouch system known as a so-called total system in the process of preparing prints. In this system, the graphic is inputted by a digitizer. The graphic and an image (pictorial pattern) are displayed on a color CRT. The color original is, however, scanned at a specified magnification by a color scanner. After effecting an A/D conversion, the color original information is stored in a storage unit. The color original information stored therein is displayed on the color CRT in accordance with the input graphic information. Editing is carried out within a main storage unit of a computer by an interactive input. The information is stored again in a magnetic disk or the like in a format corresponding to the output picture. Subsequently, the color image information corresponding to the output picture after being edited undergoes a D/A conversion. The thus converted information is thereafter inputted to an output control circuit of the color scanner. A desired layout image is thereby obtained. There arise, however, the following defects inherent in the layout retouch system described above. A large capacity storage medium is needed for storing the information on the color originals. A high-speed computer is also required for the editing process. The system construction is very costly. The editing process also takes a large amount of time.

To obviate those defects, an image input/output system (Japanese Patent Laid-open No. 11062/1984) depicted in FIG. 1 was proposed. A color original 2 is stuck onto a rotary input drum 1. The color original 2 is spottily image-outputted onto a recording material or a color paper 11 stuck onto a rotary output drum 10. This image-outputting is based on the information which has been graphic-inputted by a digitizer 14 serving as a graphic input device. The color original 2 is spottily scanned by a read head 21 and is thereby color-separated. Color separation signals CS obtained by reading the image information are inputted to a logarithmic converting circuit 3. The logarithmic converting circuit 3 converts the color separation signals CS into density signals DN. Thereafter, the density signals DN are converted into digital signals DS in an A/D converter 4. The digital density signals DS are inputted to a signal processing section 5 and a micro-processor 12 as well. The signal processing section 5 performs color processes such as a color correction, sharpness emphasis and a gradation conversion. Color-processed image information DSA are converted into analog signals by a D/A converter 6. The analog signals are inputted to a modulator 8 incorporated into a laser beam printer. Laser beams emerging from a laser oscillator 7 are modulated. The color paper 11 stuck onto the output drum 10 is spottily exposed to the modulated laer beams through an output head (not illustrated).

On the other hand, a console 16 equipped with a keyboard is prepared as a data/instruction input device. The data inputted from the console 16 is further inputted to a computer 13. The information processed by the computer 13 is displayed on an interactive type graphic display 15. The computer 13 is connected to a microprocessor 12 as a low-order system. The density signals DS coming from the A/D converter 4 are inputted to the microprocessor 12 connected to the signal processing section 5. An arithmetic operation is effected therein. Note that the computer 13 and the microprocessor 12 are combined to constitute a computer system. An instruction to the operator is displayed on the graphic display 15 in accordance with a program incorporated therein. Positions of the input and output drums 1 and 10 are detected by an unillustrated detector. The positional information thereof is inputted to a motion control section 9. The motion control section 9 is connected to the microprocessor 12 so that the control unit 9 relatively drive-controls a positional relation between the input drum 1 and the output drum 10. The digitizer 14 has an X-Y axis and original point coordinates intrinsic to the device. The digitizer 14 is capable of moving the original point to an arbitrary point by signal processing and easily rotating the coordinates. A corresponding relation between the digitizer 14 and the position of image on the input drum 1 is established by providing guides such as pins in a plurality of common positions. The digitizer 14 is connected to the computer 13, whereby an image configuration and desired positional coordinates can be inputted.

The image input/output system described above, however, has the following defects. When reading the original, as illustrated in FIG. 2, the color original 2 is stuck directly to the cylindrical input drum 1 formed of an acrylic resin, glass or the like to have a smooth transparent surface. The color original 2 is irradiated with the light emerging from a light source 20 provided inwardly of the input drum 1. Transmitted light from the color original 2 is received by a read head 21, whereby an image of the original 2 is inputted, In this case, if a gap equivalent to a wave length of light of the light source 20 is formed between the color original 2 and the input drum 1. Newton's ring (interference fringes) is caused due to interference action of the light between the underside of the color original 2 and the surface of the input drum 1. Newton's ring appears as a fringe-like ununiformity in density on the color original 2, resulting in a remarkable in quality of the original. To prevent such interference fringes, powders of hyperfine particles have hitherto been spread between the color original 2 and the input drum 1, or alternatively fillers have been applied therebetween. The powders have such defects that the particles become visible when increasing the image magnification, and the powders are hard to deal with. The fillers also have defects, wherein it is troublesome to apply and wipe off the fillers.

The image input/output system such as a total color scanner is arranged as follows. Ths system inputs the image information of an original film or the like. After performing enlargement/reduction thereof, the image information is outputted in an arbitrary layout. The original is read in the same way with the case of FIG. 2. In the image input/output system, however, it is required to know the coordinates of the color original 2 on the input drum 1 when reading the original for the layout. For this purpose, in the prior art, as illustrated in FIG. 3, the color original 2 is stuck onto a transparent rectangular sheet-like original sticking base 22 having a thickness of 100 μm by use of sticking tapes 23. Corresponding pins of the digitizer are fitted in positioning holes 24. The coordinates of a necessary portion of the color original 2 are inputted to the image input/output system. Thereafter, as depicted in FIG. 4, corresponding pins 25 of the input drum 1 are fitted in positioning holes 24 formed in the base 22, thus attaching the base. The color original 2 is, as in the same way with the case of FIG. 2, irradiated with the light emerging from the light source 20 provided inwardly of the input drum 1. The read head 21 receives the transmitted light LT travelling from the color original 2. An image of the color original is thereby inputted. The layout process is effected with a correspondence to the coordinates inputted by the digitizer.

The conventional color scanner requires a skillful operator to determine the separating conditions. Besides, the time for determining the separating conditions is longer than the time for which the scanner actually rotates. Furthermore, the conventional color scanner is intricate in operation, and a psychological load on the operator of the scanner is large.

A color sepration scanner has been developed to obviate the defects incidental to the above-described drum type color scanner. This color separation scanner performs the process by reading the color original by a plane scanning method with a TV camera. This type of scanner also presents problems in terms of a speed-up of the reading process and an efficiency as well. An additional problem is that setting of the processing conditional parameters is troublesome.

In the image processing systems including the conventional color scanner and image input/output system, there is given no consideration to show what kind of status the original may assume when reading the image. This is the real situation. For this reason, a big loss in consumption of the photosensitive material is caused depending on the original reading directions. In addition, a large utility of the scan reading time of the input original is also produced. The user of the image processing system therefore demands for enhancing the output quality by increasing the read resolving power in the input unit.

SUMMARY OF THE INVENTION

It is an object of the present invention, which has been devised under such circumstances, to provide an image processing system exhibiting the following characteristics. The troublesome original sticking process is eliminated. It is possible to automatically or manually set image processing conditions based on automatic analysis of original data with a good operability. Rough prescanning and fine main scanning are carried out in time series. Prescan data is stored and then displayed. Made are contrivances in terms of placement of slits and image outputting as well. The productivity of preparing prints is thereby improved. Provided are a speed preference mode and a photosensitive material consumption preference mode which are appropriately selectable by the user. A quality preference mode which can be indicated as the necessity arises is also provided.

According to one aspect of this invention, for achieving the objects descrived above, there is provided an image processing system for preparing a halftone film or a printing plate by optically reading an original accommodated in an original cassette by plane scanning, properly processing read data and thereafter recording the processed data on a photosensitive material, characterized by selectively indicating a speed preference mode to reduce a plane scanning time to the greatest possible degree, a photosensitive material consumption preference mode to decrease as much consumption of the photosensitive material as possible and a quality preference mode to set the original and placement of output images so as to enhance a scanning resolution of the original.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a view showing one example of an original board of this invention;

FIG. 7 is a diagram illustrating a mechanism for loading an original cassette;

FIG. 9 is a diagram showing a relation between a light source and an original;

FIG. 10 is a view illustrating a principal structure of slits employed in this invention;

FIG. 17 is a representation of a display example, showing an existence and non-existence of the original;

FIGS. 18A and 18B are diagrams showing examples of accommodating the original in the original cassette;

FIG. 19 is a diagram of assistance in explaining the representation on a picture;

FIGS. 24A to 24C and 25A to 25C are diagrams showing examples of the output patterns;

DESCRIPTION OF THE PREFERRED EMBODIMENTS

Figure 5:
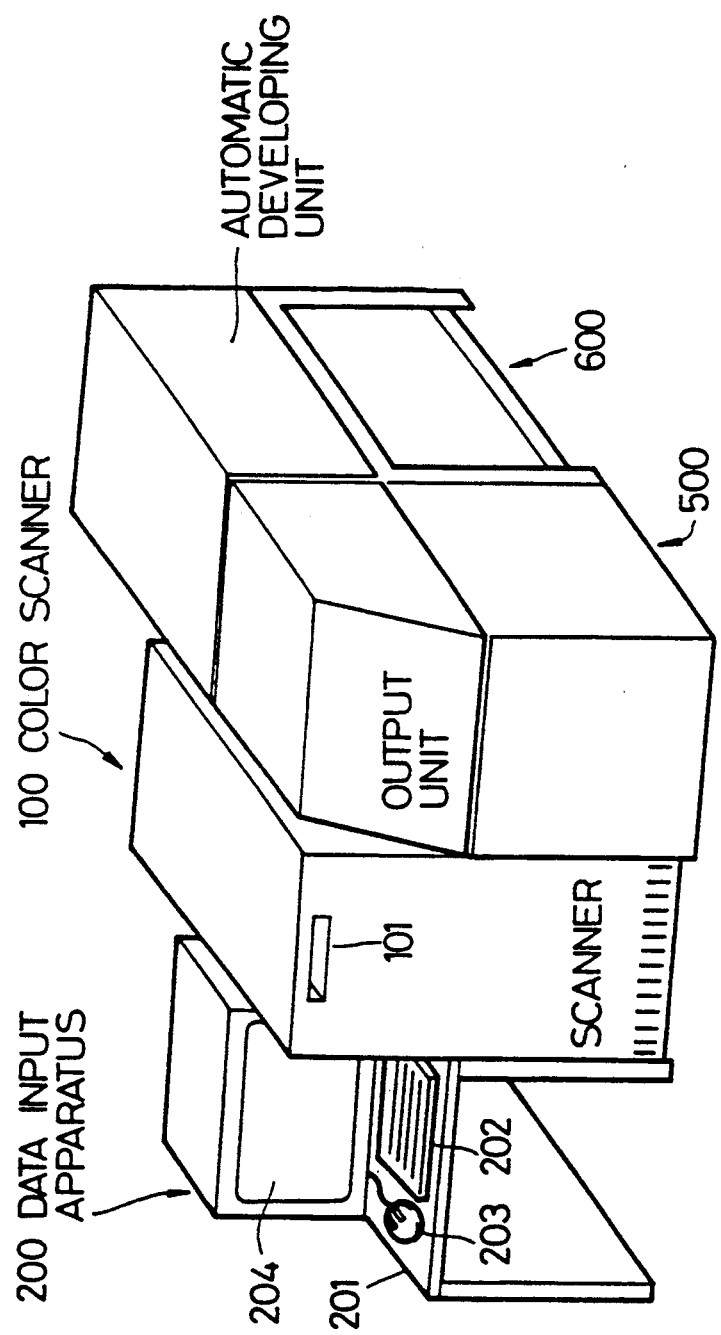
FIG. 5 is a sketch drawing showing one embodiment of this invention.

FIG. 5 illustrates an external configuration of an image processing system of this invention. The image processing system includes a color scanner 100, disposed at the center, for processing an image by reading an original image. Formed in an upper portion of the color scanner 100 is a cassette insert port 101 for inserting an original cassette which accommodates a color original. A desk 201 is positioned in the vicinity of the color scanner 100. Placed on the desk 201 are a mouse 203 and a keyboard 202 by which the operator inputs necessary data and instructions to a data input apparatus 200. A CRT 204 for displaying the necessary information and the original image in a picture frame divided mode is provided upwardly of the desk 201. An output unit 500 outputs a halftone film on the basis of the data processed by a signal processing unit 400 incorporated into the scanner 100, which will be mentioned later. The output unit 500 is installed in close proximity to the scanner 100. There is also provided an automatic developing unit 600 for developing a process film outputted from the output unit 500. A speed preference mode, a photosensitive material consumption mode, a quality preference mode are indicated through the keyboard 202 or the mouse 203. Note that the placement of the respective system units is not limited to the one depicted in FIG. 5.

FIG. 6 shows a structure of an original table 110 of an image reader unit of the color scanner 100. The whole original table 110 assuming a box-like shape is scanned in auxiliary scan directions by use of a movable member 111 connected to the original table 110 in combination with a wire 112 and a motor 113. The wire 112 and the motor are connected to this movable member 111. The original table 110 accommodates a rotary board receiver 115 rotated by a motor 114 in illustrated directions. A cassette receiver 116 for receiving an original cassette 30 is provided at the center of the rotary board receiver 115. The rotary board receiver 115 as a whole is scanned in trimming directions by a movable member 117 connected to a movement plate 130 thereof in combination with a wire 118 and a motor 119. The wire 118 and the motor 119 are connected to the movable member 117. Note that the movable members 111 and 117 may involve the use of a screw rod and a nut for scanning. An upper surface of an onset portion of the original table 110 in the auxiliary scanning direction is formed with a transparent correction region 131 for correcting shading of an optical system by reading a fundamental optical quantity at a read starting time of prescan. The correction region 131 serves as a home position in the auxiliary scanning directions. At the start of scanning, an image sensor is capable of detecting just the correction region 131. Aligned on an upper surface of the rotary board receiver 115 are guide rollers 140–142 and 143–145 for carrying the original cassette 30 so as to hold two sides of the original cassette 30. A top end of the guide roller is provided with a stopper 132 for positioning the original cassette 30. Besides, appropriate positions of the original cassette 30 are marked with symbols (not illustrated) for indicating a size and an ID number of the original to be accommodated. Those symbols are read by a detector till the original cassette 30 is inserted and loaded into the cassette receiver 116.

On the other hand, FIG. 7 schematically illustrates a structure of an interior of an input section 150 of the color scanner 100. The original cassette 30 is carried onto a carrier passageway via the cassette insert port 101 of the input section 150. Carrier rollers 152–154 are arranged aside and upwardly of the carrier passageway 151. Driving rollers 151–157 are attached via driving shafts to the carrier rollers 152–154. A belt 162 is stretched between the driving rollers 155–157 and a driving shaft 161 of a motor 160. The motor rotationally drives the carrier roller 152–154. The original cassette 30 is thereby carried on the carrier passageway 151 while being guided. The original cassette 30 thus carried is further sent and loaded into the original table 110 fully illustrated in FIG. 6.

Figure 8:
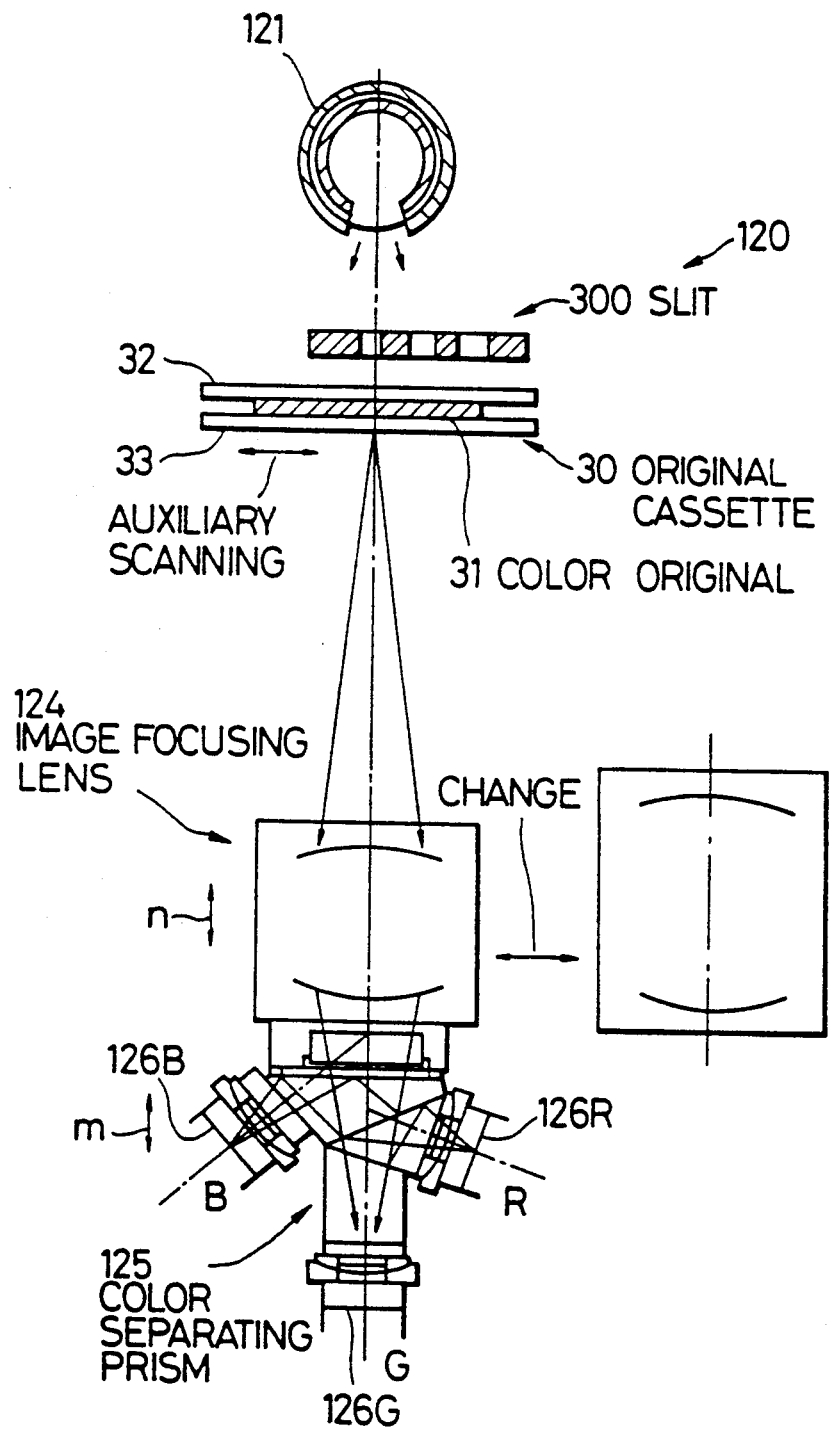
FIG. 8 is a diagram depicting an optical system of an image input unit.

FIG. 8 depicts an optical system of the input unit of the scanner 100. The original cassette 30 loaded into the cassette receiver 116 is irradiated with light of a line aperture type fluorescent lamp 121 placed upwards via a flare preventive slit 300 which will be mentioned later. The original cassette 30 houses a color original 31 such as color reversal film of 35 mm, Brownie or a size of 4″×4. The color original 31 is held by a pair of reflection preventive transparent glasses 32 and 33 for holding the original. Image light traveling through the slit 300 and the original cassette 30 is inputted to image focusing lens 124 each having a predetermined magnification. The image light is further inputted to a color separation prism 125 connected to a lower part of the image focusing lens 124. The image light is thereby separated into three primary colors R, G and B. The three color-separated beams R, G and B are inputted to image sensors (126R, 126G, 126B) each composed of a CCD or the like. Those beams are converted into picture signals PS of RGB. Note that the plurality of image focusing lens 124 prepared therein are changeable into a lens system having a predetermined magnification by use of a turret. FIG. 9 shows a scanning relation between the fluorescent lamp 121 and the color original 31. Linear main scanning lines 31A are read simultaneously and scanned in the auxiliary scanning directions, thus reading an entire image.

In accordance with this invention, the variable-width slit is formed between the fluorescent lamp 121 and the original 31 (original cassette 30) to prevent the flare of the optical system. The slit having the least width is set per reading/scanning operation within a range where a predetermined light quantity is satisfied. FIG. 10 is a perspective view showing one example of a position adjusting mechanism of the slit 300. Slits 310a, 310b and 310c each having a different slit width are formed. Disposed in a predetermined position between the fluorescent lamp 121 and the original 31 is a light blocking plate 310 movable in arrowed directions P with the aid of a slit position adjusting mechansim 300A. A matting black coating (e.g., brand name: Sunday Paint (Dai-Nippon Toryo Co., Ltd)) is coated or printed on the surface of the light blocking plate 310. Hence, an optical magnification of the image is varied by moving the image sensor 126 and the image focusming lens 124 in arrowed directions m and n in the figure. In this case, the light blocking plate 310 is shifted in the arrowed direction P by the slit position adjusting mechanism 300A. The narrowest slit suited to the present optical magnification is positioned on the optical axis. A clear image is thereby obtained.

Figure 11:
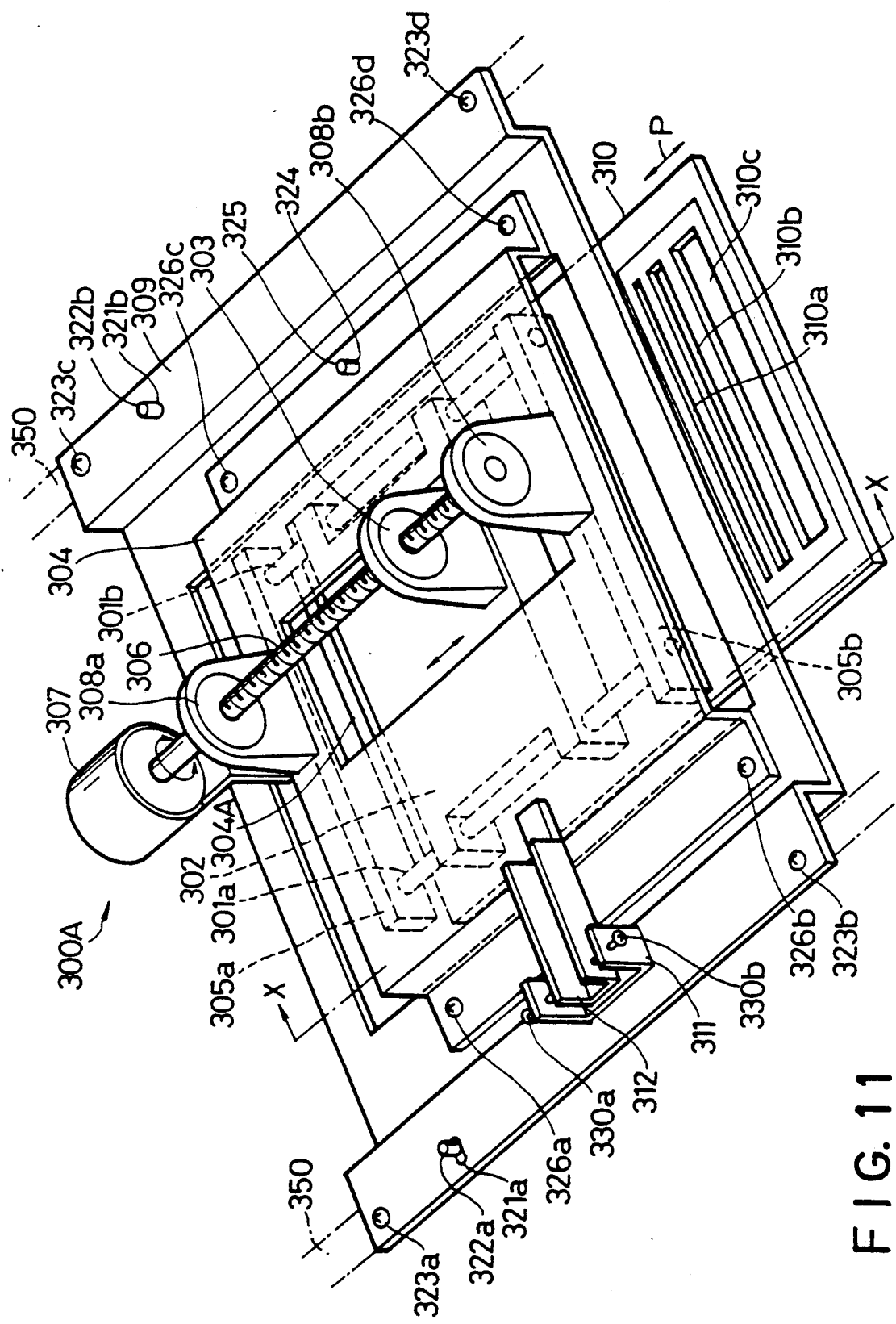
FIG. 11 is a view showing a driving mechanism thereof.
Figure 12:
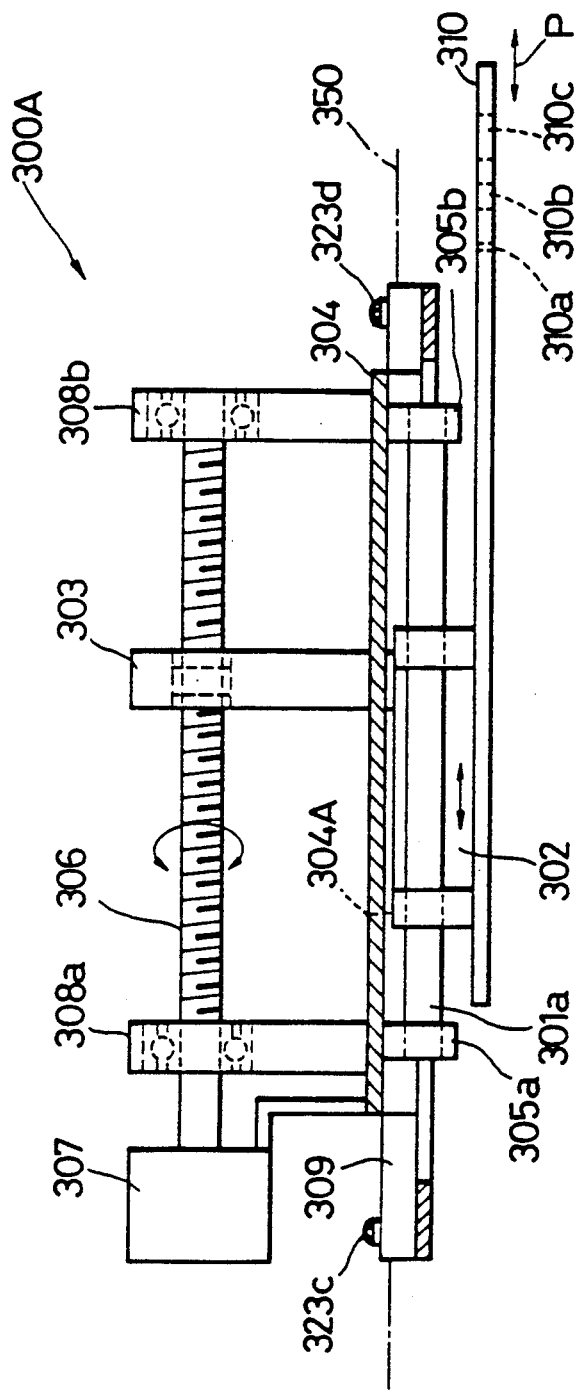
FIG. 12 is a structural sectional view taken substantially along the line X—X of FIG. 11.

FIG. 11 is a schematic perspective view showing one example of the slit position adjusting mechanism 300A. FIG. 12 is a sectional view taken substantially along the line X—X thereof. Fixed onto the light blocking plate 310 is a slider 302 slidable along two guide rods 301a and 301b placed in parallel to the moving direction P of the light blocking plate 310. Fixed onto the slider 302 is a nut 303 of a ball screw disposed in parallel to the moving direction P of the light blocking plate 310. Moreover, a baseplate 304 is provided with a predetermined gap so as not to contact an opposite surface of the slider 302 to the foregoing fixing surface. The baseplate 304 is disposed so that the nut 303 of the ball screw protrudes from an opening 304A formed in the baseplate 304. Both ends of guide rods 301a and 301b are fixedly supported on support members 305a and 305b fixed to one surface (on the side of the slider 302) of the baseplate 304. A pulse motor 307 rotates a male screwed into the nut 303 of the ball screw. Bearings 308a and 308b retain the male screw 306. The pulse motor 307 and the bearings 308a and 308b are fixed to the other surface of the baseplate 304. Only the baseplate 304 is fixed to a baseplate 309 fixed to a machine board 350. Other members (e.g., the light blocking plate 210, the slider 302 and the like) do not contact the baseplate 309. Fixed to the baseplate 309 is an inclination adjusting means 311 having side surfaces into which screws 330a and 330b are screwed. One end of an inclination adjusting lever 312 is positioned between the screws 330a and 330b of the inclination adjusting means 311. The other end of the inclination adjusting lever 312 is fixed to the baseplate 304 so as not to contact the inclination adjusting means 311.

Based on the above construction, an adjustment of a slit position involves the following steps. Positioning pins 322a and 322b provided on the machine board 350 are fitted into positioning holes 321a and 321b holed in the baseplate 309. The baseplate 309 is thus positioned and thereafter fixed to the machine board 350. A hole 325 is formed in the baseplate 304 mounted with the light blocking plate 310. Fitted into the hole 324 is an inclination adjusting pin 325 provided on the baseplate 309. The baseplate 304 is thus temporarily positioned. The light blocking plate 310 is moved by driving the pulse motor 307, thereby positioning a desired slit on the optical axis. The image light, the configuration of which is linearly transformed via the slit 300, is inclined to the image sensor 126. At this time, one of screws 330a and 330b of the inclination adjusting means 311 is slackened, whereas the other is fastened. As a result, the inclination adjusting lever 312, the baseplate 304 and the light blocking plate 310 gyrate about the inclination adjusting pin 325. An inclination of the image light linearly transformed via the slit 300 can be set to zero. The thus positioned baseplate 304 is fixed to the baseplate 309 with fixing screws 326a, 326b, 326c and 326d. With this arrangement, the image light linearly transformed via the slit 300 can be incident on an appropriate position of the image sensor 126.

Figure 13:
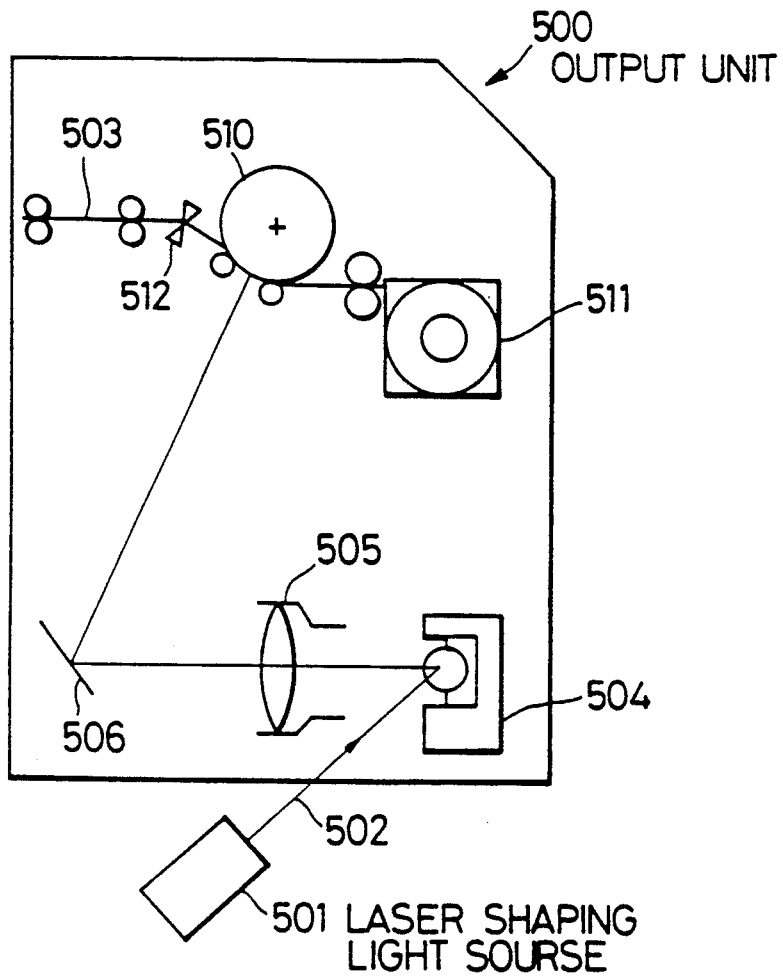
FIG. 13 is a diagram showing one example of an output unit.

FIG. 13 schematically illustrates a construction of the output unit 500. The output unit 500 works as a slave of a signal processing unit 400 of the scanner 100. The output unit 500 executes control sequences constant with respect to a command transferred by an interface RS-232C. The output unit 500 sends back a resultant status to a CPU 401, serving as a host, of the signal processing unit 400. More specifically, when transmitting a status check signal to the output unit 500 from the CPU 401, the output unit 500, if in a possible exposure state, sends a "ready" signal. Subsequently, the output unit sends back an "OK" signal in response to an exposure-ready inquiry signal transmitted from the CPU 401. An exposure is then effected. The picture signal coming from the signal processing unit 400 undergoes halftone processing in a halftoning circuit 531 which will be mentioned later. The picture signal is thereby converted into an ON/OFF signal. A photosensitive material 503 is exposed to a laser beam 502 emitted from a laser shaping light source 501 consisting of laser diodes. A main scanning of the laser beam 502 involves the use of a resonant scanner 504. The photosensitive material 503 on an auxiliary scanning drum 510 is exposed to the laser beam, by which the main scanning has been performed, therough an fθ lens 505 and a mirror 506 as well. The auxiliary scanning drum 510 carries out an auxiliary scanning with respect to the laser beam 502. The drum is rotated by a DC servo motor under PLL control. The photosensitive material 503 is housed in a photosensitive magazine 511. The photosensitive material 503 is carried while passing above the auxiliary scanning drum 510 through a carrier roller. The photosensitive material 503 is cut off to predetermined lengths by a cutter 512 and then discharged.

Halftone processing is based on a digital system in which the picture signals are sequentially compared with a set of 8-bit thresholds (halftone data). The halftone data are, if standard, stored in an ROM. The data other than the above-mentioned are loaded from a floppy disk provided as an option. The output unit 500 acts invariably as a slave for the signal processing unit 400. The output unit 500 has only the functions to execute the sequences constant with respect to the command coming from the RS-232C and send back the resultant status. Therefore, the output unit 500 does not start the communications at all.

Based on the above configuration, the signal processing unit 400 manages the output unit 500 through communications, thereby performing a series of sequences during the exposure. The output unit 500 further incorporates functions which can be started from a panel of the signal processing unit 400, these functions including initial load, cleaning, cutting and setting of a photosensitive material residual quantity register. The initial load is herein defined as a process to cut and initialize, in the case of mounting the photosensitive magazine 511 or opening the cover due to an occurrence of jam, the portion at which the light strikes on the photosensitive material 503 just when being fed to a predetermined position (the material is irradiated with the light). Cleaning is defined as a process to resupply a developer, a fixing solution and washing water. This process requires the steps of pulling out a predetermined amount of photosensitive material 503, cutting the material, thereafter feeding the material to the automatic developing unit 600 and operating the automatic developing unit 600. Cutting is conceived as a process to cut and discharge the photosensitive material 503 pulled out for exposure. Setting of the photosensitive material residual quantity register is a function effected as follows. A residual quantity of the photosensitive material 503 is set when mounting the photosensitive material magazine 511. The residual quantity is subtracted every time cutting and discharging are carried out. The subtracted value is displayed.

Figure 14A:
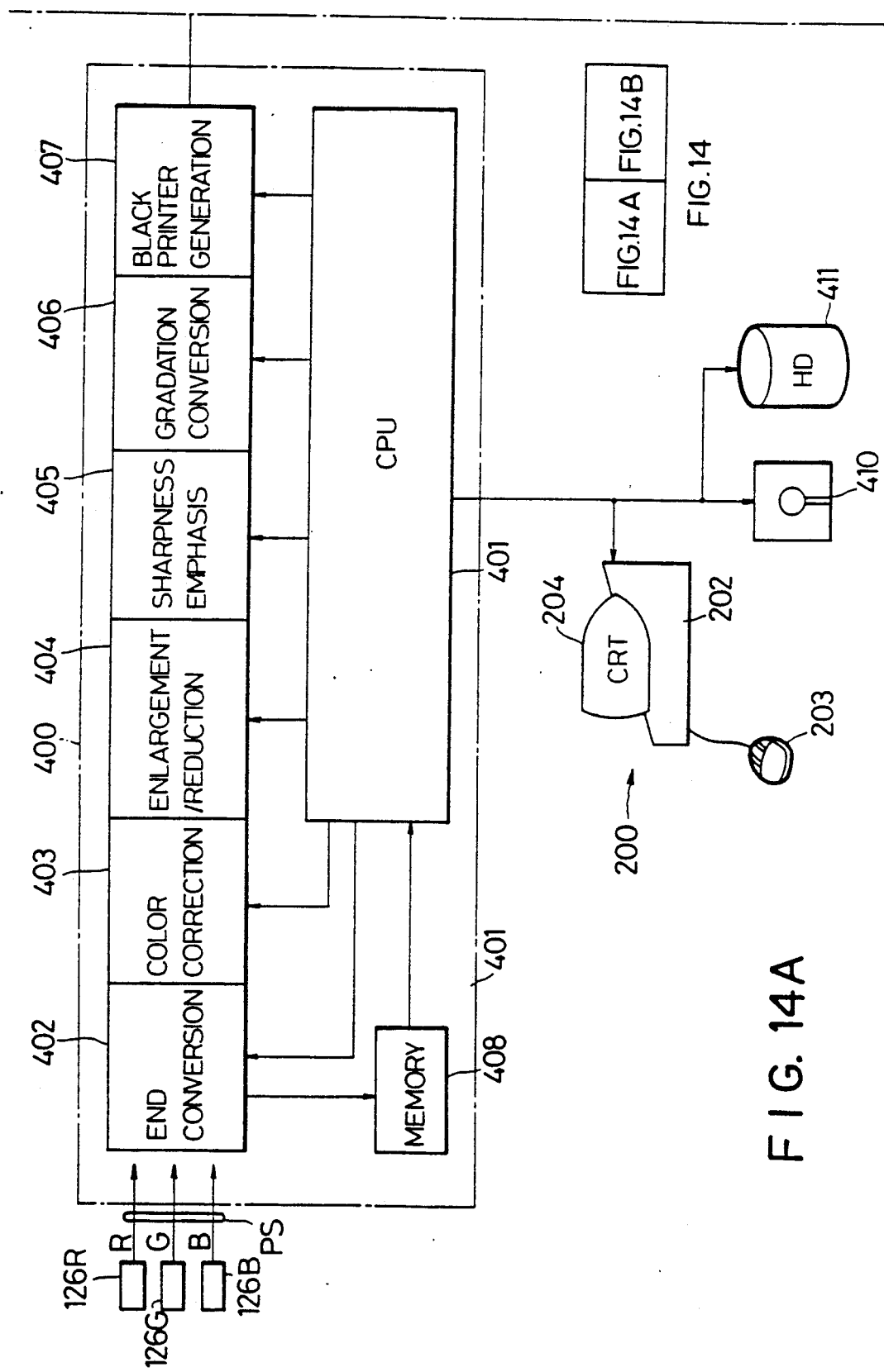
FIGS. 14A and 14B is a block diagram illustrating a circuit system of this invention.
Figure 14B:
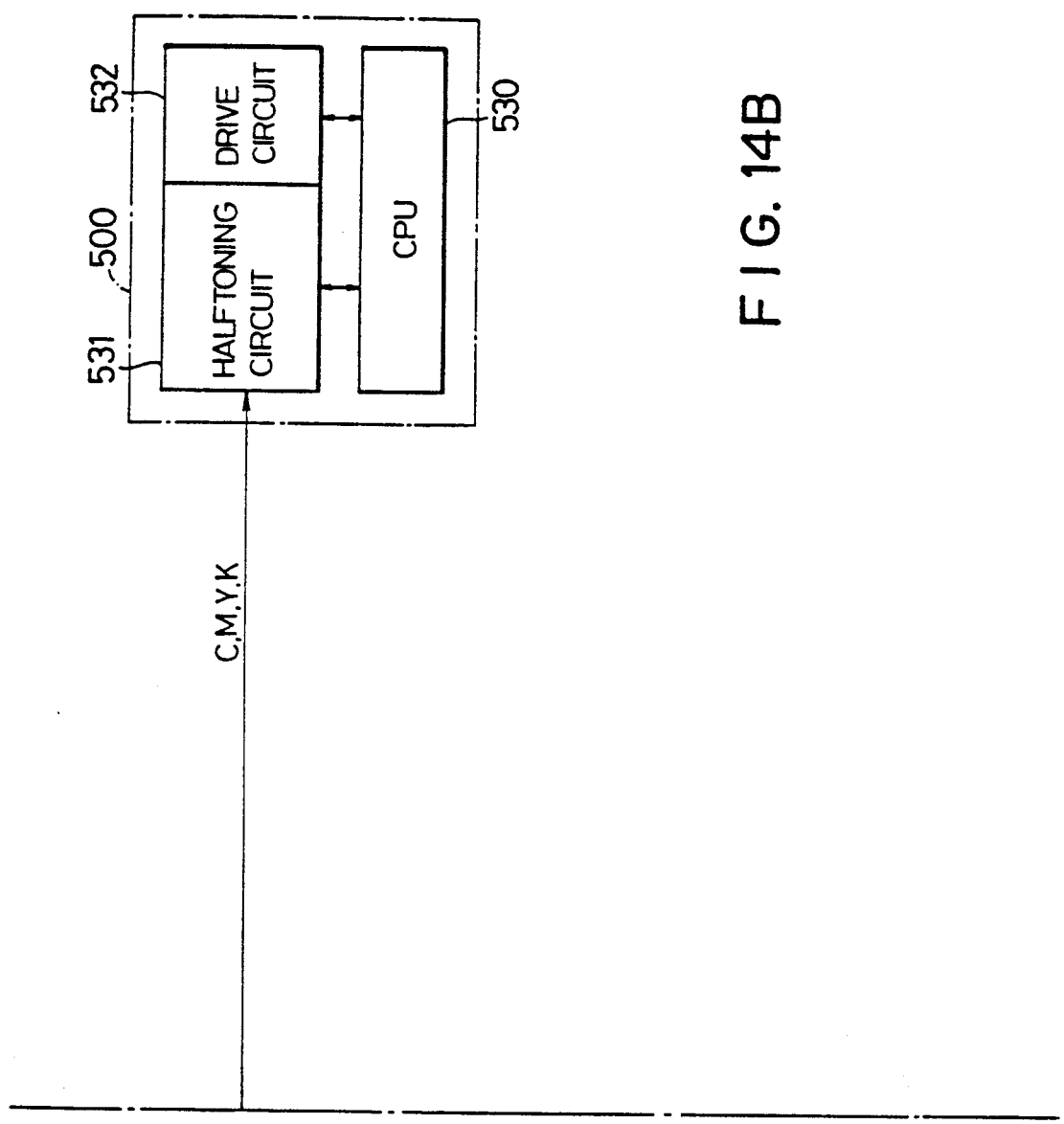

FIG. 14 depicts an internal configuration of the color scanner 100. RGB picture signals are outputted from the image sensors 126R, 126G, 126B of the optical system 120 of the input unit of the scanner 100. The RGB picture signals are A/D converted and inputted to the signal processing unit 400. The signal processing unit 400 includes the CPU (host computer) 401 for controlling the overall system. The CPU effects an equivalent neutral density (END) conversion 402, a color correction 403, an enlargement or reduction 404, a sharpness emphasis 405, a gradation conversion 406 and a black printer generation 407 as the necessity arises. Connected to the CPU 401 are a floppy disk 410 and a hard disk 411 which the necessary data are read from or stored in. Prescan data, which has undergone the END conversion, is stored in a memory 408. A data input apparatus 200 is connected via the CPU 401 to the signal processing unit 400. Photoengraving signals of four colors such as C, M, Y, K (black) are transmitted to the output unit 500. Laser beams 502 are emitted to the laser shaping light source 501 via the halftoning circuit 531 and the drive circuit 532. The halftoning circuit 531 and the drive circuit 532 within the output unit 500 are controlled by a CPU 501.

Figure 15:
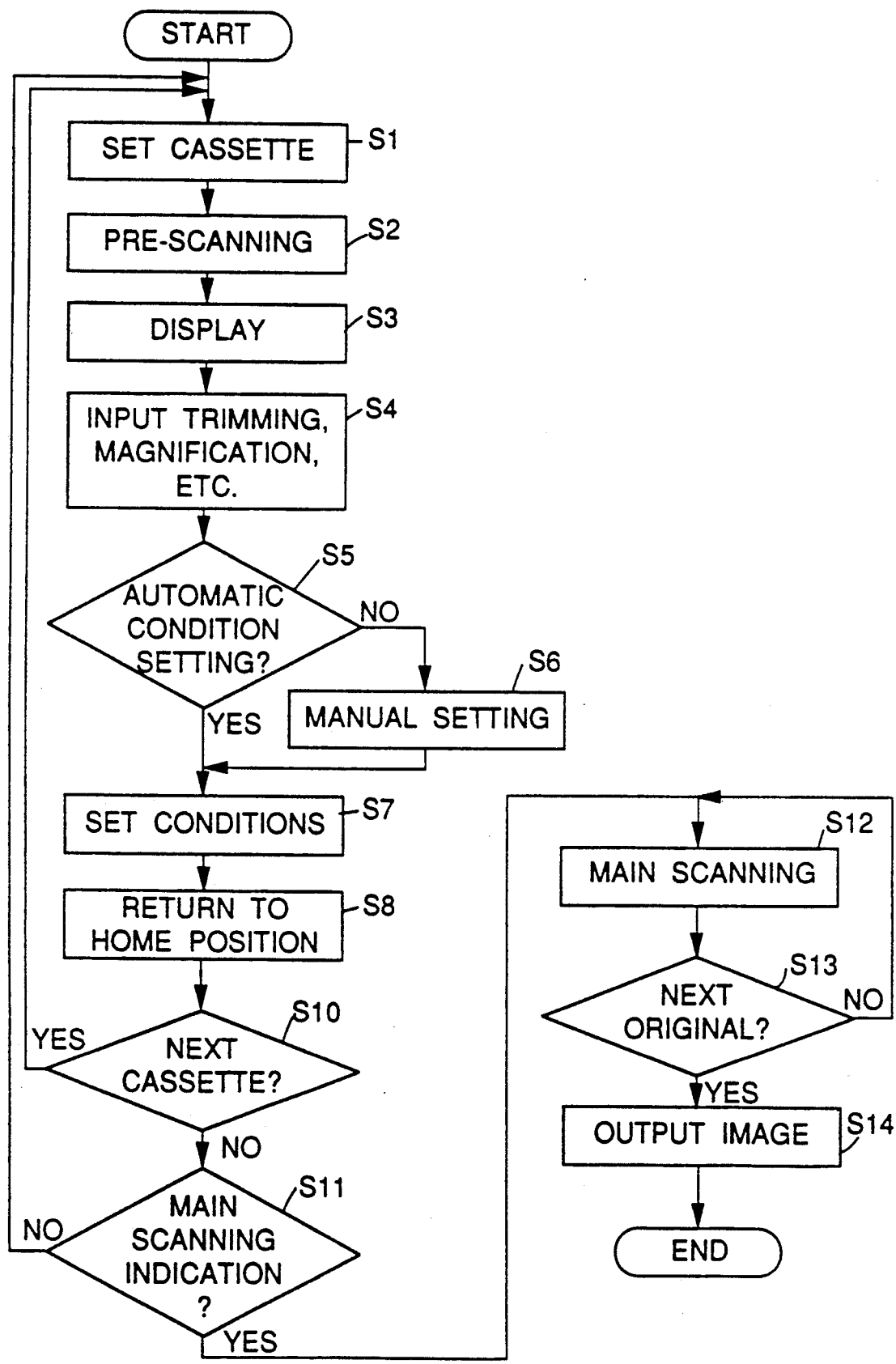
FIG. 15 is a flow chart showing an operating example of this invention.

Based on the construction the operation will be explained with reference to a flow chart of FIG. 15. In this case, the user of the image processing system employs the keyboard 202 or the mouse 203 to indicate a speed preference mode, a photosensitive material consumption preference mode and a quality preference mode. The speed preference mode is intended to lessen (reduce) the time (the number of scannings) or main scan by the scanner 100 to the greatest possible degree. The consumption preference mode is intended to decrease as much consumption of the photosensitive material 503 as possible. The quality preference mode is to set both the original cassette 30 and the placement of output image to enhance a read resolution of the scanner 100 with respect to the color original 31. A memory 408 incorporates a blanking management table 408A which will be mentioned later.

At the first onset, the original cassette 30 is inserted from the cassette insert port 101 and set in an original read unit within the scanner 100 (Step S1). The original cassette 30 is, however, automatically inserted into a cassette receiver 116. On detecting loading of the original cassette 30, the original table 110 is carried to the home position. At this moment, the symbols put on the original cassette 30 are read to discern an original size, an ID number and an original pattern.

Figure 16:
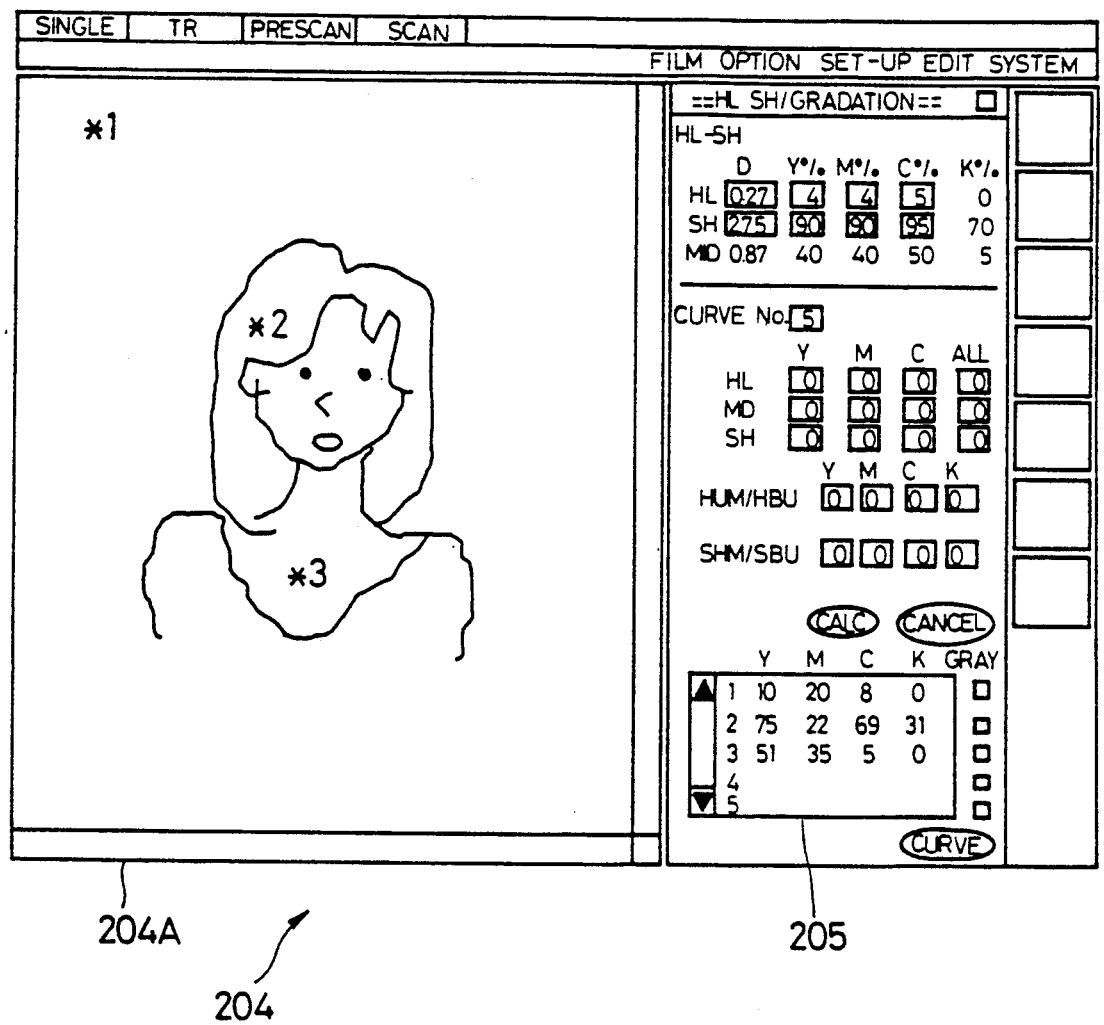
FIG. 16 is an example representation of a display.

The optical system remains in the home position. When indicating the prescan, the rough prescan is automatically started from the home position of the correction region 131 (Step S2). In this case, the correction region 131 of the original table 110 is at first read. Based on the read data thereof, the signal processing unit 400 calculates and sets the correction data about shading or the like. A thinning-out rate, a scanning velocity and a read range are set in accordance with the read original size information. Then starts the prescan. The home position of the optical system serves as an optical magnification for effecting the prescan. The prescan is carried out invariably with a constant optical magnification irrespective of the original size. The prescan data conceived as image data read by thinning-out are END-converted within the signal processing unit 400. The resultant data are stored in the memory 408 and at the same time, as illustrated in FIG. 16, displayed on the CRT 204 of the data input apparatus 200 (Step S3). Concurrently with this step, an existence and non-existence of the color original 31 within the original cassette 30 are displayed as illustrated in FIG. 17 (a mark indicates the existence of the original, whereas a mark x indicates the non-existence thereof). FIG. 17 shows an example where one cassette contains six originals. The discernment is made when a plurality of originals is settable in one cassette. Read from the memory 408 is data within a region defined by 10×10 pixels in lengthwise/crosswise directions, with the central point of the image data serving as a left upper angle thereof. The data is then sampled. Sampling may be effected for one color data. A mean value obtained by sampling at 100 points is compared with a threshold $V_{TH}$, thereby discerning the existence and non-existence of the original.

100-point mean value $< V_{TH} \rightarrow$ original uncharged 100-point mean value $\geq V_{TH} \rightarrow$ original charged.

As is obvious from FIG. 16, a prescanned image is displayed on a display part 204A provided to the left of one picture. In the other right side portion which is not overlapped with this display part, image processing conditions are displayed and inputted. The image display is performed with respect to the original indicated by the keyboard 202 or the mouse 203. Image processing arithmetic at a plurality of arbitrary points of the image displayed is simulated. The simulation result is displayable on a display column 205. A simulation result at an indicating point *1 of FIG. 16 corresponds to "1" of the display column. Similarly, a simulation result at an indicating point *2 corresponds to "2". A simulation result at an indicating point *3 corresponds to "3". Note that the display of the display column is rewritable in real time concomitant with a change in the image processing conditions. Incidentally, the original cassette 30 accommodates, as depicted in FIG. 18A, one sheet of original having a size of 4"×5". As illustrated in FIG. 18B, the cassette 30 accommodates two sheets of originals in Brownie and 6 sheets of originals of 35 m/m. Images of the respective originals are electrically enlarged by the signal processing unit 400 to maximize the resolution on the display part 204A of the CRT 204. The enlarged images are displayed as shown in FIG. 9. The image in a trimming range defined by diagonal points Q1, Q2 is displayed in enlargement. The optical magnification during the main scan is automatically varied corresponding to the trimming range set on the prescan image. The original table 110 is thereby moved in the main scanning direction.

Inputted and set by means of the data input apparatus 200 are data on trimming, magnification and, if necessary, other data on the number of output lines, negative/positive and rotary angle (Step S4). Those data should invariably be set per original. There is specified a set-up mode (automatic, manual) of conditional parameters needed for image processing (Step S5). If the automatic mode is selected, the conditional parameters are automatically set based on the prescan data stored in the memory 408 (Step S7). The conditional parameters are displayed on the right display part of the CRT 204, whereas if the manual mode is selected, the conditional parameters are manually inputted through the keyboard 301 (Step S6). An output of the prescan image is simulated with the aid of the set image processing conditions. The simulation result is displayed in the display column 205. The conditional parameters are set referring to the results. The conditional parameters are set based on the image data stored in the memory 408 by the prescan. In consequence of this step, the original cassette 30 (or the original) is removable out of the system during the set-up. The conditional parameters includes a coefficient value for correcting the color, sharpness coefficients for sharpness enphasis and an inclination of gradation conversion. Automatic setting by prescan is effected by methods disclosed in, e.g., Japanese Patent Laid-open Nos. 111569/1987 and 111570/1987 made by the present applicant.

After executing the preprocess described above, the read part is returned to the home position (Step S8), and the next cassette is loaded. Whether the prescan is effected or not is judged (Step S10). If the next cassette is not loaded, the image of the color original 31 of the original cassette 30 which has been inputted is read in accordance with an indication of main scan (Step S11). In this case, however, the original cassette 30 is rotated by the rotary board receiver 115. Subsequently, the cassette 30 is moved by the movable member 117 in the trimming directions and by the movable member 111 in the auxiliary scanning directions. A region of a line 31A shown in FIG. 7 undergoes the main scan (Step S12). In the main scan, the main scan information is transferred to the input section 120 of the scanner 100, the signal processing unit 400 and the output unit 500. An instruction to start the main scan is thus given. The optical system moves to a necessary optical magnification position. Then, the correction region 131 is read to calculate and set the correction data. The indicated read range is subjected to the main scanning process. More specifically, the light, which has been emitted from the fluorescent lamp 121 and has penetrated, is inputted to the image focusing lens 124. The light is color-separated into RGB by means of the color separation prism 125. Images of the color-separated beams are formed on the image sensors 126R, 126G and 126B. The picture signals PS for one detected line are outputted from the image sensor 126R, 126G and 126B. The picture signals PS are inputted to the signal processing unit 400. Under the foregoing set conditions, the signal processing unit 400 performs the processes such as the END conversion 402, the color correction 403, the enlargement or reduction 404, the sharpness emphasis 405, the gradation conversion 406 and the black printer generation 407. The color correction is herein carried out by a method disclosed in, e.g., Japanese Patent Laid-open No. 178355/1983. The sharpness emphasis is effected by a method disclosed in, e.g., Japanese Patent Laid-open No. 54570/1985. The END conversion and the gradation conversion inclusive may be performed by a method disclosed in Japanese Patent Laid-open No. 11062/1984.

The foregoing main scan is effected (Step S12), though this will be stated later in relation to the previously indicated speed preference mode, the photosensitive material consumption preference mode and the quality preference mode. After this step, the output unit 500 outputs the image (Step S13). Note that a size of the photosensitive material 503 employed in the output machine 500 is set beforehand in the blanking management table 408A. Sent to the output unit 500 are printing plate signals of C, M, Y, K which are obtained in the signal processing unit 400 by processing the image data of the main scan. The printing plate signals undergo halftone processing in the halftoning circuit 531. The thus processed signals are transmitted to the drive circuit 532 of the laser shaping light source 501, wherein beams are emitted with binary signals of dot outputs. The laser beams 502 emitted from the light source 501 are inputted to the resonant scanner 504 and the fθ lens 505. The laser beams 502 are reflected by the mirror 506. The photosensitive material 503 is exposed to the laser beams at a position of the auxiliary scanning drum 510. The exposed photosensitive material 503 is cut off to predetermined lengths by the cutter 512. The cut materials are transferred to the automatic developing unit 600, wherein the development is performed to prepare 4-color printing plate of C, M, Y, K. After finishing the main scan and setting of condiions of all the originals, an instruction to eject the original cassette 30 is given. The original cassette 30 is thereby automatically carried and ejected from the cassette insert port 101.

Figure 20:
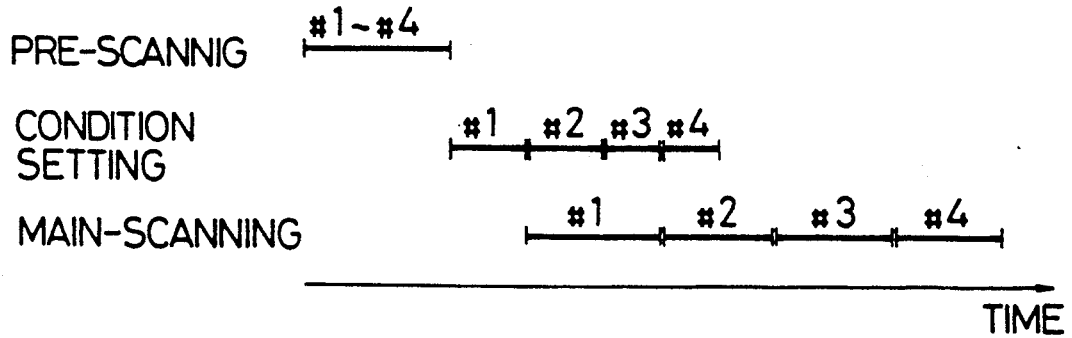
FIG. 20 is a chart showing relations between prescan, setting of conditions and main scan.

FIG. 20 herein shows time relations between the prescan, setting of conditions and main scan with respect to originals #1 through #4. The main scan of the original, in which setting of conditions has been finished, is effected completely in parallel to setting of conditions of the next original.

Figure 21A:
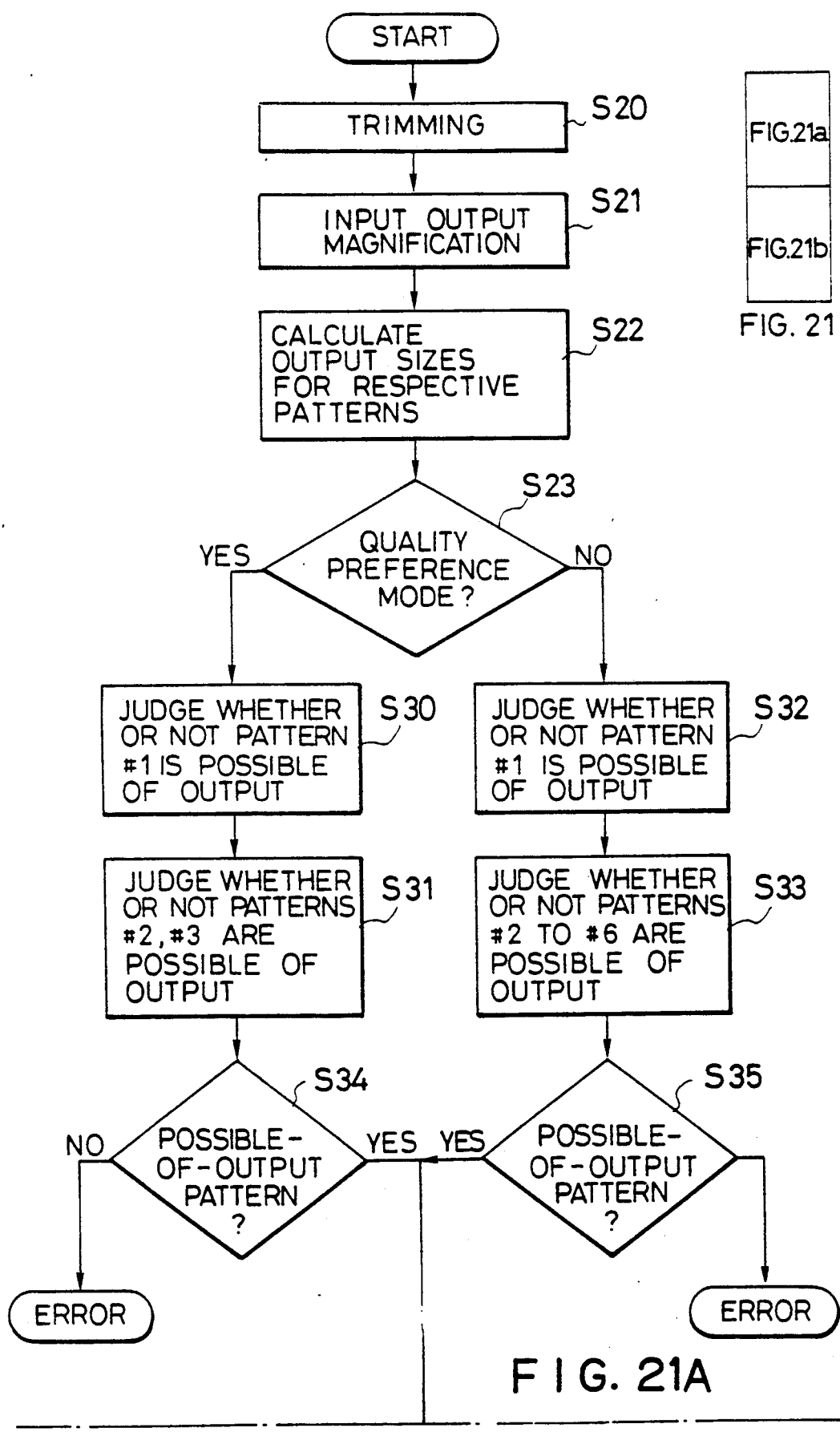
FIGS. 21A and 21B is a flow chart showing an operating example of this invention.
Figure 21B:
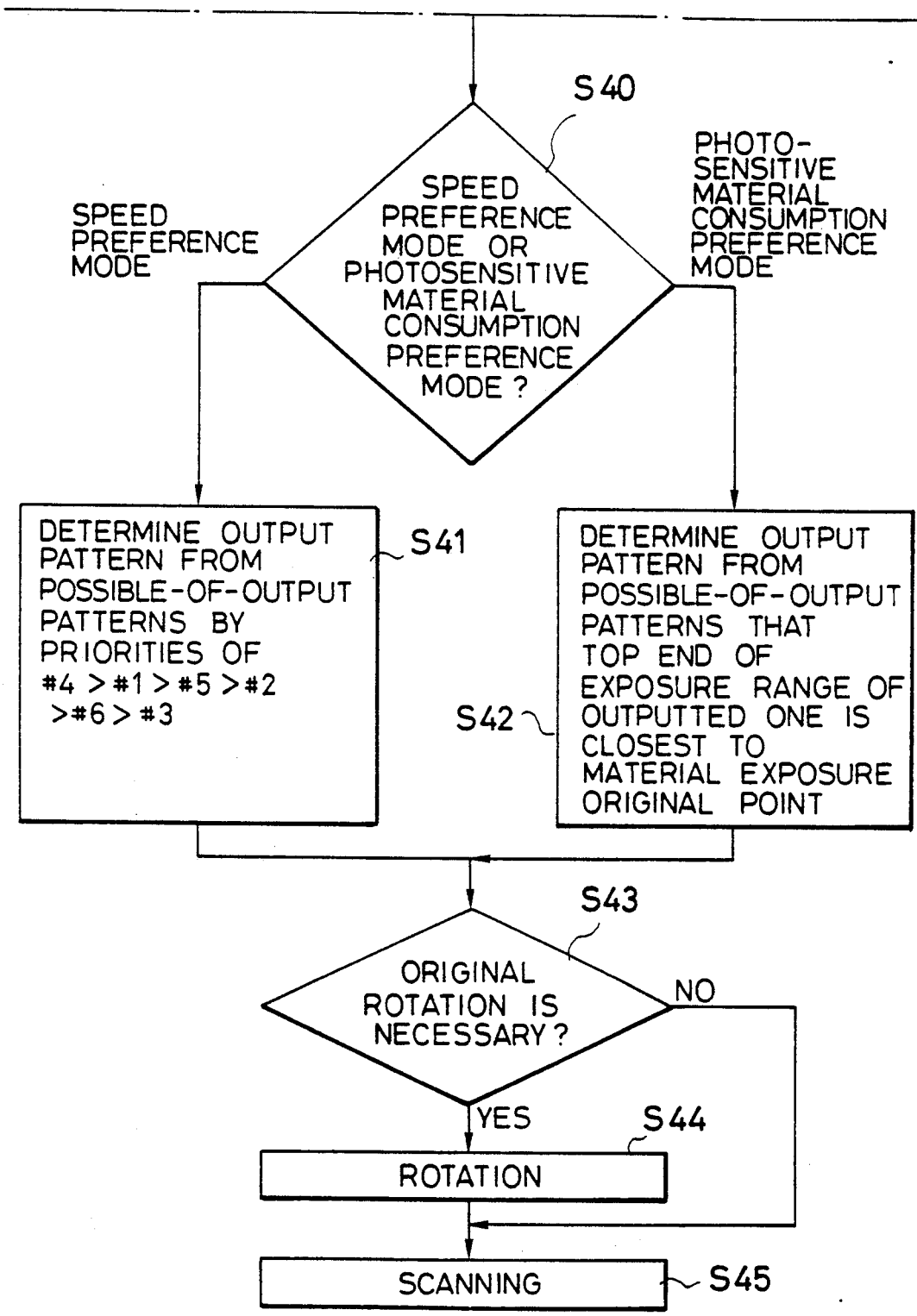

The operation of the main scan according to this invention will next be described with reference to a flow chart of FIG. 21.

Figure 22:
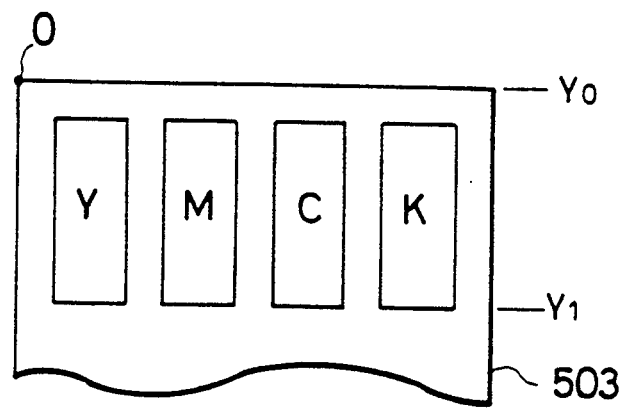
FIGS. 22 and 23 are diagrams each showing a relation between output patterns and a photosensitive material.
Figure 23:
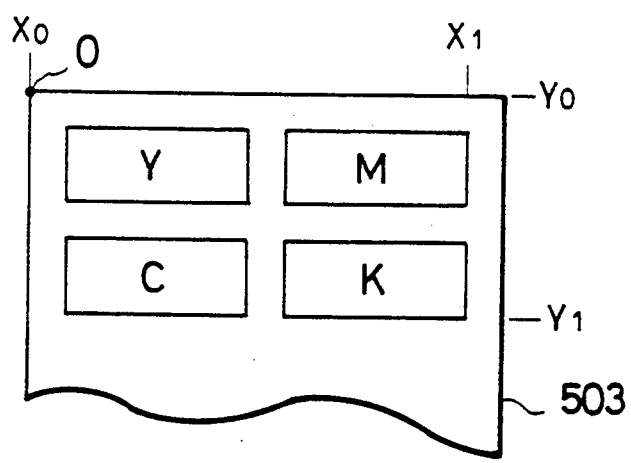

In accordance with this invention, the speed preference mode, the photosensitive material consumption preference mode and the quality preference mode can be indicated beforehand. The speed preference mode is, however, intended to reduce as much scanning time as possible. In the case of outputting four plates of YMCK, it is enough to effect scanning once on an output pattern depicted in FIG. 22. Based on an output pattern of FIG. 23, however, scanning has to be performed twice. Eventually, if follows that the output pattern of FIG. 22 permits faster scanning than does the output pattern of FIG. 23. The speed preference mode is a mode to automatically select and output the pattern possible of output at a high speed. The photosensitive material consumption preference mode is intended to decrease as much consumption of the photosensitive material 503 as possible. Supposing that outputting is effected with the same size, the output pattern of FIG. 23 is smaller in $Y_1$ than the output pattern of FIG. 22. Hence, the consumption of the photosensitive material 503 is, it can be said, small. The photosensitive material consumption preference mode is set to automatically select and output the output pattern on which the consumption of the photosensitive material 503 is reduced to the greatest possible degree. According to this invention, the four printing plates of YMCK are outputted. FIGS. 24A to 24C depict lengthwise patterns (patterns #1-#3). FIGS. 25A to 25C illustrate crosswise patterns (patterns #4-#6). Those two types of patterns are selectable corresponding to the output size. The management as to whether those patterns #1-#6 can be outputted or not is made by use of the blanking management table 408A within the memory 408. Note that in this embodiment, the four plates of YMCK are outputted, but two or three or even one color may be available.

Figures 26A, 26B:
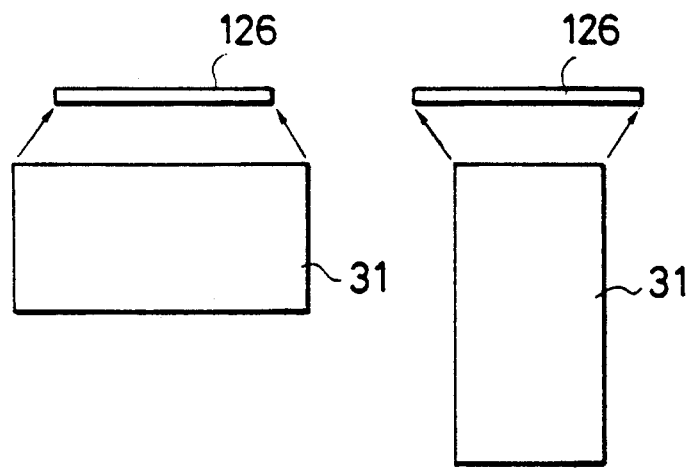
FIGS. 26A and 26B are diagrams of assitance in explaining a read resolution.
Figure 27:
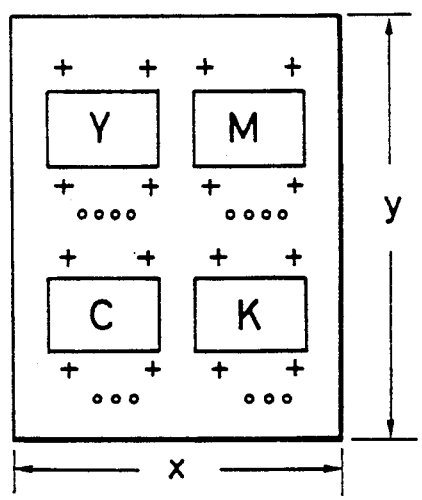
FIG. 27 is a diagram of assistance in explaining an output size.

The quality preference mode is a mode to enhance the quality of the output image by increasing the read resolution power of the scanner 100 with respect to the original 31 in the input section 150. The resolution power is higher in a relation between the original 31 and the image sensor 126 of FIG. 26B than in a relation between the original 31 and the image sensor 126 of FIG. 26A. For this reason, when setting the quality preference mode, the short sides of the original 31 are read by main scanning. The lengthwise patterns #1-#3 of FIGS. 24A to 24C are used as output patterns. Note that the user selects any one of the speed preference mode and the photosensitive material consumption preference mode. The user further makes a decision of whether the quality preference mode is adopted or not. The quality preference mode need not necessarily be indicated.

When starting the main scan, the trimming range is, as in the previous case, at first inputted (Step S20). The output magnification is inputted from the data input apparatus 200 (Step S21). In accordance with the inputted trimming range and the output magnification, the output sizes for the respective patterns #1-#6 are calculated (Step S22). The calculation of the output sizes requires the following steps. All of resist works and a train of characters are added. Thereafter, a rectangular region defined by the output size of x×y is obtained when outputting the plates of YMCK, this region containing all the plates of YMCK. If a plurality of exposure processes are carried out, the calculation is made adding an interval of exposure units adjacent in a direction y.

Thereafter, whether the quality preference mode is indicated or not is judged (Step S23). If indicated, the short sides of the original 31 are read by the main scanning. The output patterns are therefore limited to the lengthwise patterns. Referring to the blanking management table 408A, whetehr or not the patterns #1-#3 can be outputted is judged (Steps S30, S31). Whereas if not, whether or not all the patterns #1-#6 can be outputted is judged referring to the blanking management table 408A (Steps S32, S33). In any case, whether the possible-of-output patterns exist or not is judged (Steps S34, S35). If there is not possible-of-output pattern, an error comes out. The blanking management table 408A stores, though this will be stated later, the statuses up to the last output together with the size of the photosensitive material. It is therefore feasible to judge whether outputting is possible or not from the sizes of the patterns #1-#6.

If it is judged at the Steps S34, S35 that the possible-of-output patterns exist, there is made a judgement as to whether or not the speed preference mode or the photosensitive material consumption preference mode is indicated (Step S40). If the speed preference mode is indicated, the output pattern is determined from the possible-of-output patterns according to the following priorities: pattern #4>pattern #1>pattern #5 >pattern #2>pattern #6>pattern #3 (Step S41). In this case, if the scanning time (the number of scannings) is the same, there is taken such a pattern that the top end ($Y_1$ in FIGS. 22 and 23) of the printing plate to be outputted in the closest to a photosensitive material exposure original point 0 (see FIGS. 22 and 23). If the photosensitive material consumption preference mode is indicated, the output pattern is determined from the possible-of-output patterns, wherein the top end $Y_1$ in the exposure range of the outputted one is the closest to the photosensitive material exposure original point 0 (Step S42).

Figure 28A:
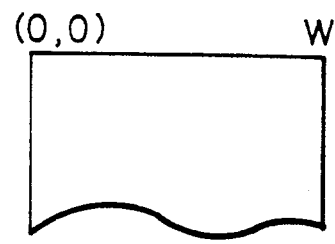
FIGS. 28A to 28C and FIG. 29 are diagrams of assistance in explaining a blanking management table.

The blanking management table 408A herein stores the output statuses up to the last output. This table 408A also stores y-coordinates, x-onset coordinates ×S, x-terminal coordinates ×E and a possible-of-output width W×. The initial status shown in FIG. 28A is expressed by Table 1 because of outputting nothing yet.

TABLE 1

| y | xS | xE | Wx |
|---|----|----|-----|
| 0 | 0  | W  | W   |
| −1 |   |    |     |

Note that "−1" in Table 1 indicates a terminator, "W" represents the exposure width in the main scanning direction, and "y" denotes the width in the auxiliary scanning direction, thE width "y" being set so as not to exceed an exposure length.

Figure 28B:
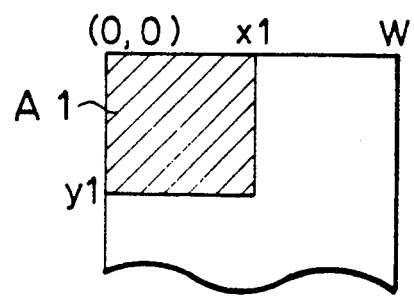

An output pattern A1 of FIG. 28B is next outputted. Modified in this case are both a possible-of-output range of y-coordinates y=0 of the onset at which the pattern A1 is outputted and a possible-of-output range of y-coordinates y=y1 of the terminal. These ranges are shown in Table 2.

TABLE 2

| y | xS | xE | W |
|---|----|----|---|
| 0 | X1 | W  | W − X1 |
| y1 | 0 | W | W |
| −1 |   |   |   |

Figure 28C:
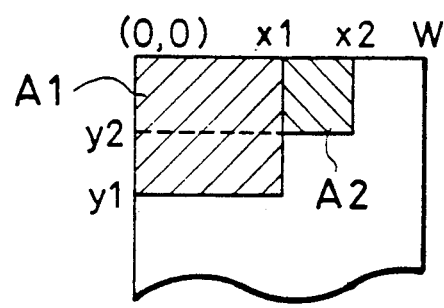

As illustrated in FIG. 28C, an output pattern A2 is outputted. Modified are a possible-of-output range of y-coordinates y=0 of the onset at which the pattern A2 is outputted and a possible-of-output range of y-coordinates y=y2 of the terminal. These ranges are shown in Table 3.

TABLE 3

| y | xS | xE | W |
|---|----|----|---|
| 0 | X1 | W | W − X2 |
| y2 | X1 | W | W − X1 |
| y1 −1 | 0 | W | W |

Figure 29:
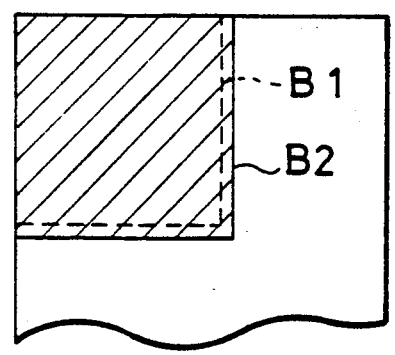

Namely, y=0 and WX=W invariably in the initial status. When outputting and making a modification, the possible-of-output ranges of the y-coordinates of the onset and of the terminal of the outputted exposure range are changed. If there is not element of the y-coordinates of the terminal, the elements are newly prepared. The elements are inserted in the array so as not to disorder the ascending sequence of the y-coordinates. In the case of changing the possible-of-output range, as illustrated in FIG. 29, the interval of the adjacent exposure units is added. The symbol B1 of FIG. 29 indicates an output size calculated at the Step S22. The symbol B2 indicates an output size for modifying the blanking management table 408A, whether or not the patterns #1-#3 are possible of output is judged at the Steps S30 and S31. At the Steps S32, S33, whether the patterns #1-#6 are possible of output or not is judged. Referring to the blanking management table 408A, the pattern is determined at the Step S41 according to the following priorities: pattern #4>pattern #1>pattern #5>pattern #2>pattern #6. Referring again to the table 408A, at the Step S42, there is obtained the pattern in which the top end of the exposure range is the closest to the photosensitive material original point 0.

Figure 30:
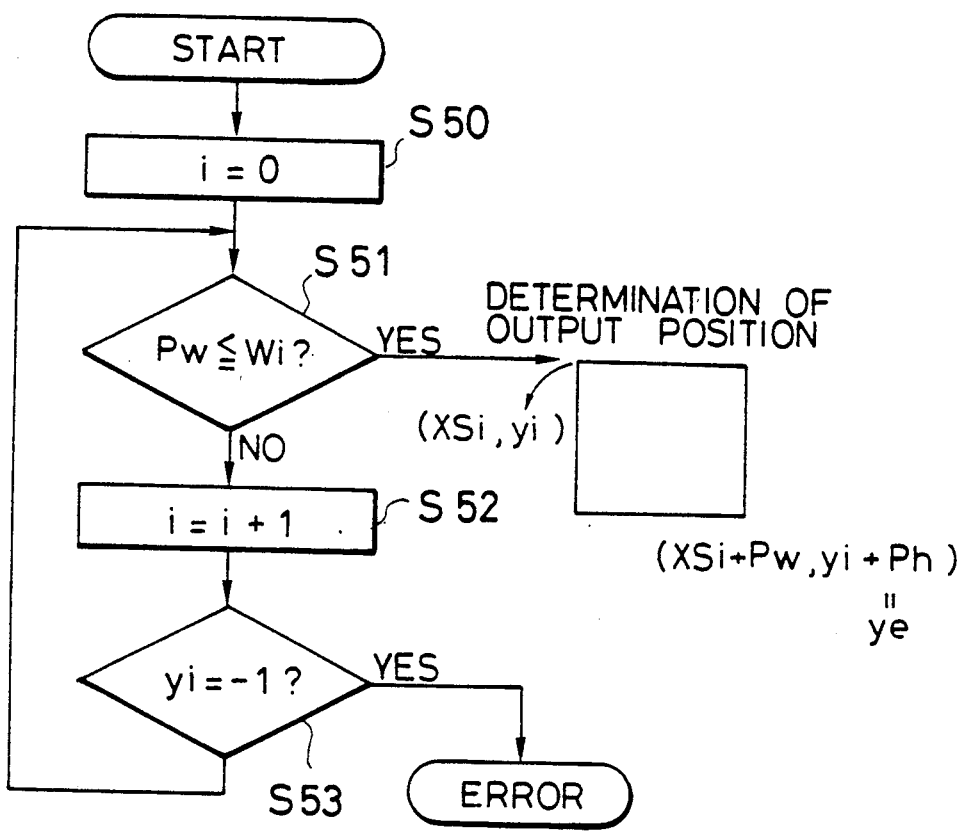
FIG. 30 is a flow chart showing a method of determining an output position of the pattern.

Coordinates ye of the terminal when determining and outputting an output position are calculated with respect to the pattern determined in the manner discussed above. FIG. 30 shows a calculation algorithm of the output positions of the respective patterns. In this algorithm, "Ph" is the exposure length in the auxiliary scanning direction, "Pw" is the exposure length in the main scanning direction of the pattern, and the blanking management table 408A are expressed by yi, XSi, XEi, Wi. In association with the possible-of-output region, the output pattern is, as depicted in FIG. 29, set at the left uppermost portion. Note that in the case of 4-colors (3-colors, 2-colors) outputting, if all the plates (4 plates in the case of 4-color outputting) can not be outputted as a block within the maximum exposure size, divisional outputting is effected.

Thereafter, whether the original is required to be rotated or not is judged (Step S43). If necessary, the original is rotated (Step S44). Scanning is then performed (Step S45).

Figure 1:
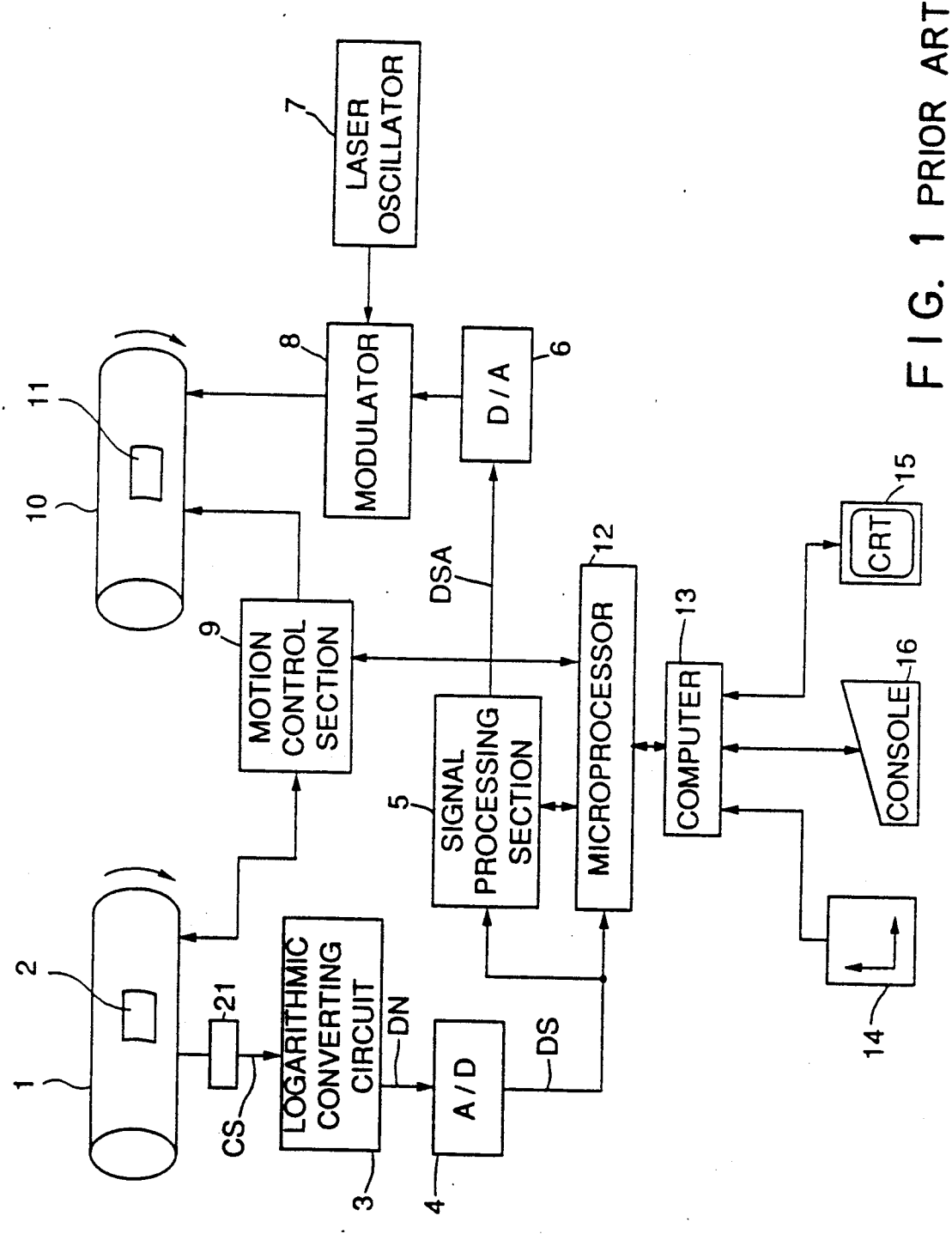
FIG. 1 is a block diagram showing one example of a conventional image input/output system.
Figure 2:
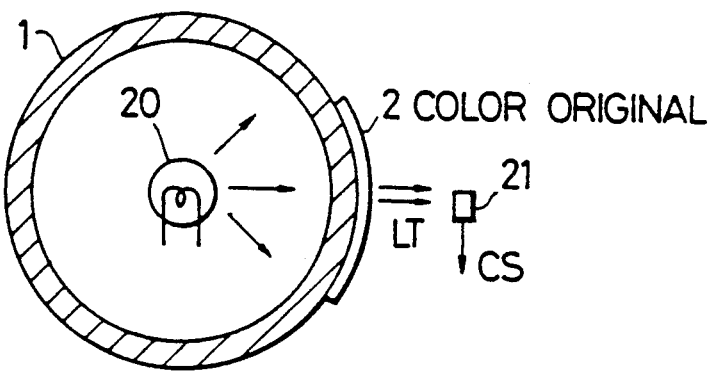
FIGS. 2 through 4 are diagrams of assistance in explaining a color original stuck onto an input drum.
Figure 3:
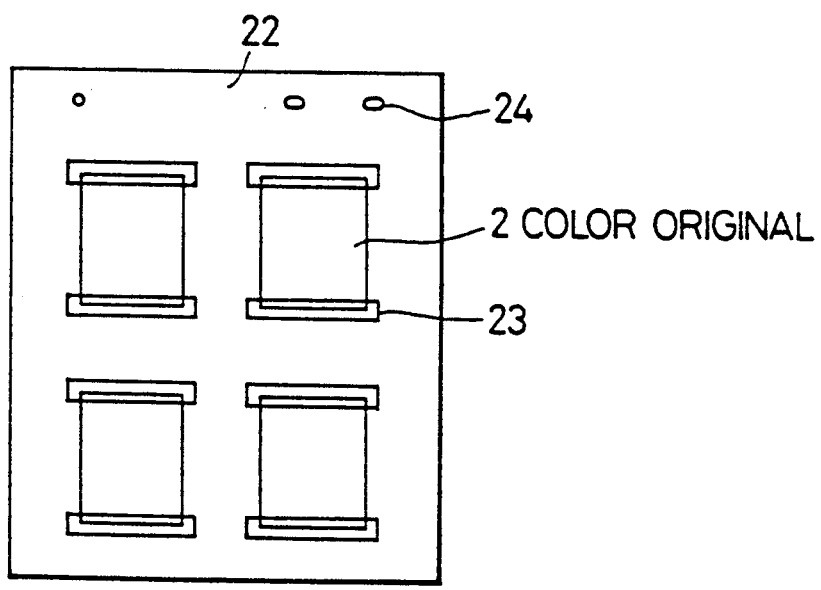
Figure 4:
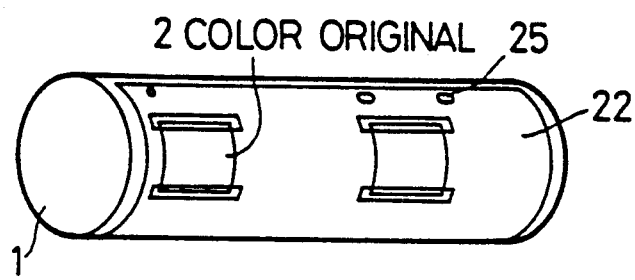

In accordance with the embodiment discussed above, the output size is calculated by inputting the trimming and the magnification. Alternatively, however, the magnification may be calculated by inputting the trimming range upon inputting the output size. To be more specific, a physical trimming range (Xa, Ya) on the original is calculated by inputting the trimming range. The output size inputted is expressed by (Xb, Yb). A main scanning magnification is calculated by Xb/Xa, while an auxiliary scanning magnification is calculated by Yb/Ya. In the embodiment shown in FIG. 4, the original is read by a transmissive method. The configuration may, however, be based on a reflective method; or the input units based on these two methods are provided in combination and employed by a circuitwise changeover.

The image processing system of this invention exhibits the following advantages. The system is of the cassette type which requires no sticking of the original. The operation is therefore simple. The high-speed input is possible because of the input method based on the plane scanning. It is feasible to improve an availability factor of the scanner. The original is read by the prescan and main scan. The conditional parameters are set based on the stored prescan data, and at the same time the image is displayed. The image is processed based on the main scan data, and ouputting is then effected. The productivity in operation is remarkably improved.

Besides, the image processing system of this invention is provided with the speed preference mode, photosensitive material consumption preference mode and quality preference mode which are to be indicated by the user. It is therefore possible to obtain an efficient and rational working situation.

It should be understood that many modifications and adaptations of the invention will become apparent to those skilled in the art and it is intended to encompass such obvious modifications and changes in the scope of the claims appended hereto.

What is claimed is:

1. An image processing apparatus for preparing half-tone films or printing plates comprising:
    means for optically reading an original accommodated in an original cassette by plane scanning to obtain image data;
    means for processing said read image data and thereafter recording said processed data on a photosensitive material; and
    means for selectively indicating one of a speed preference mode so as to reduce a plane scanning time to the greatest possible degree, a photosensitive material consumption preference mode so as to decrease consumption of said photo-sensitive material, and a quality preference mode so as to set said original and placement of output images so as to enhance a scanning read resolution of said original.

2. An image processing system as claimed in claim 1, wherein said printing plates are four plates of CMYK and have lengthwise patterns or crosswise patterns, and said means for selectively indicating determines whether said lengthwise patterns or said crosswise patterns are chosen based on the mode selected.

3. An image processing system as claimed in claim 2, wherein said means for selectively indicating includes a blanking management table for controlling output of said lengthwise patterns or said crosswise patterns based on the mode selected.

4. An image processing system as claimed in claim 1, further comprising means for user selection one of said speed preference mode and the photosensitive material consumption preference mode, and means for optionally selecting said quality preference mode.

5. An image processing system as claimed in claim 2, wherein said lengthwise patterns are selected in response to said quality preference mode.

6. An image processing system as claimed in claim 4, wherein said printing plates are four plates of CMYK and have lengthwise patterns or crosswise patterns, said means for selectively indicating determines whether said lengthwise patterns or said crosswise patterns are chosen based on the mode selected, and wherein said lengthwise patterns are selected in response to said quality preference mode.

* * * * *